(12) United States Patent
Mori et al.

(10) Patent No.: US 9,469,361 B2
(45) Date of Patent: Oct. 18, 2016

(54) VEHICLE INCLUDING STEPS

(71) Applicant: HONDA MOTOR CO., LTD., Minato-Ku, Tokyo (JP)

(72) Inventors: Yotaro Mori, Wako (JP); Akira Kashiwagi, Wako (JP); Naoto Yamagishi, Wako (JP); Satoru Nojima, Wako (JP); Jun Tanaka, Wako (JP); Yasushi Miyagi, Wako (JP); Akito Hiramatsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/864,254

(22) Filed: Sep. 24, 2015

(65) Prior Publication Data

US 2016/0090139 A1 Mar. 31, 2016

(30) Foreign Application Priority Data

Sep. 30, 2014 (JP) .................................. 2014-202412

(51) Int. Cl.
- *B62H 1/08* (2006.01)
- *B62J 25/00* (2006.01)
- *G05D 3/00* (2006.01)

(52) U.S. Cl.
CPC *B62J 25/00* (2013.01); *G05D 3/00* (2013.01)

(58) Field of Classification Search
CPC ..................................................... B62J 25/00
USPC .................. 180/218, 219, 220; 280/291, 294
See application file for complete search history.

(56) References Cited

U.S. PATENT DOCUMENTS

| | | | | |
|---|---|---|---|---|
| 6,663,129 | B1* | 12/2003 | Smith | B62J 25/00 280/288.4 |
| 8,444,165 | B2* | 5/2013 | Houser | B62J 25/00 280/163 |
| 2002/0120376 | A1* | 8/2002 | Miller | G05G 1/405 701/36 |
| 2003/0084749 | A1* | 5/2003 | Orr | G05G 1/405 74/560 |
| 2005/0115354 | A1* | 6/2005 | Rinero | G05G 1/405 74/512 |
| 2007/0137397 | A1* | 6/2007 | Choi | G05G 1/36 74/512 |

FOREIGN PATENT DOCUMENTS

JP 2013-067182 A 4/2013

* cited by examiner

*Primary Examiner* — Tony Winner
(74) *Attorney, Agent, or Firm* — Carrier Blackman & Associates, P.C.; Joseph P. Carrier; Jingli Wang

(57) ABSTRACT

A motorcycle includes a step operating mechanism that changes the position of pillion steps (passenger steps), and an electronic control unit carries out step inclining control to change the position of the pillion steps, so that footrest surfaces of the pillion steps may each become an inclined surface, in which the steps are pivotally raised such that a portion of the passenger step situated at the vehicle body outside is raised toward the vehicle body upper side relative to a portion of the passenger step situated at the vehicle body inside, in response to at least one of an acceleration operation, a deceleration operation, and a turn operation of the motorcycle. Such arrangement provides a vehicle that can induce an occupant to take a riding posture suitable for the traveling status of the vehicle.

18 Claims, 19 Drawing Sheets

FIRST INCLINATION ANGLE

NEUTRAL POSITION

FIRST INCLINATION ANGLE

SECOND INCLINATION ANGLE

VEHICLE INCLUDING STEPS

CROSS-REFERENCE TO RELATED APPLICATIONS

The present invention claims priority under 35 USC 119 based on Japanese Patent Application No. 2014-202412, filed on Sep. 30, 2014. The entire subject matter of this priority document, including specification claims and drawings thereof, is incorporated by reference herein.

BACKGROUND OF THE INVENTION

1. Field of the Invention

The present invention relates to a vehicle including steps on which an occupant puts feet. More particularly, the present invention relates to a vehicle including steps and a mechanism operable to change inclination of the steps for comfortable driving and tandem traveling.

2. Description of the Background Art

Steps of a motorcycle are structural members for keeping the riding posture of a driver and a passenger. The steps play an important role in actions such as knee grip and load shift at the time of acceleration, deceleration, and turn (refer to Japanese Patent Laid-Open No. 2013-67182, for example).

Conventionally, the positions of steps are fixed in the riding state in order to keep the riding posture. However, if step positions suitable for the traveling status can be offered, it becomes possible to facilitate a more proper riding posture, which enables more enjoyable driving and tandem traveling.

The present invention is made in view of the above-described circumstances. Accordingly, it is one of the objects of the present invention to provide a vehicle that can induce an occupant to take a riding posture suitable for the traveling status of the vehicle.

SUMMARY OF THE INVENTION

Reference numbers are included in the following description corresponding to the reference numbers used in the drawings. Such reference numbers are provided for purposes of illustration, and are not intended to limit the invention.

In order to achieve the above objects, the present invention provides a vehicle that includes steps (28, 81) on which an occupant puts his feet and is characterized by including a step operating mechanism (82) that changes a step position, and a control unit (100) that changes a position (inclination) of the step (28, 81) in response to at least one of an acceleration operation, a deceleration operation, and a turn operation of the vehicle.

In the above configuration, the step operating mechanism (82) may be a mechanism that changes height of the step (28) for a driver, and the control unit (100) may carry out control to raise height of the step position on an opposite side to turn direction of the vehicle.

Furthermore, in the above configuration, the step operating mechanism (82) may be a mechanism that causes the step (28) for a driver to pivot, and the control unit (100) may carry out step inclining control to cause the step (28) for a driver to pivot in order for a footrest surface (28A) of the step (28) to become an inclined surface in which a portion of the step situated at the vehicle body outside is raised toward a vehicle body upper side relative to a portion of the step situated at the vehicle body inside in response to at least any of acceleration operation, deceleration operation, and turn operation of the vehicle.

Moreover, in the above configuration, the step operating mechanism (82) may be a mechanism that causes the passenger step (81) on which a passenger puts a foot to pivot, and the control unit (100) may carry out step inclining control to cause the passenger step (81) to pivot in order for a footrest surface (81A) of the passenger step (81) to become an inclined surface in which a portion of the step situated at the vehicle body outside is raised toward a vehicle body upper side relative to a portion of the step situated at the vehicle body inside in response to at least one of the acceleration operation, the deceleration operation, and the turn operation of the vehicle.

In the above configuration, in a case in which vehicle speed is zero, the control unit (100) may determine that the vehicle is in a starting preparatory state when a clutch of the vehicle is blocking power transmission and a shift stage of the vehicle is other than neutral and carry out the step inclining control when determining that the vehicle is in the starting preparatory state, and the control unit (100) may carry out control to move the passenger step (81) to a neutral position at which the footrest surface (81A) is flat when determining that the vehicle is not in the starting preparatory state.

Furthermore, in the above configuration, in a case in which vehicle speed is other than zero, the control unit (100) may carry out the step inclining control when acceleration of the vehicle is positive acceleration equal to or higher than a predetermined value and when the acceleration of the vehicle is negative acceleration equal to or lower than a predetermined value, and carry out control to move the passenger step (81) to a neutral position at which the footrest surface (81A) is flat when the acceleration of the vehicle falls within a predetermined range.

In addition, in the above configuration, inclination angle of the footrest surface (81A) may be changed according to one of the acceleration of the vehicle and an amount of turn in the step inclining control.

Moreover, in the above configuration, the step operating mechanism (82) may include a base member (83) supported by the vehicle, a pivot member (84) that pivotally supports the passenger step (81) to the base member (83), and an actuator (90) that causes the passenger step (81) to pivot. Furthermore, the pivot member (84) may support the passenger step (81) pivotally toward a side on which at least the footrest surface (81A) becomes an inclined surface in which a portion of the step situated at the vehicle body outside is raised toward the vehicle body upper side relative to a portion of the step situated at the vehicle body inside, and the passenger step (81) may be monolithically provided with a moved part (87) moved by the actuator (90).

Furthermore, in the above configuration, the pivot member (84) may allow the passenger step (81) to pivot to a housing position, and the moved part (87) may get away from a movable part (90A) of the actuator (90) when the passenger step (81) pivots toward the housing position.

In addition, in the above configuration, the movable part (90A) of the actuator (90) may be disposed on the vehicle body inside relative to the base member (83). Furthermore, the moved part (87) may extend to the vehicle body inside relative to the pivot member (84) and the passenger step (81) may extend from the pivot member (84) to the vehicle body outside.

Moreover, in the above configuration, the step operating mechanism (82) may include a base member (83) supported by the vehicle, a first pivot member (84) that supports, to the base member (83), the passenger step (81) pivotally toward a side on which at least the footrest surface (81A) becomes an inclined surface in which a portion of the step situated at the vehicle body outside is raised toward the vehicle body upper side relative to a portion of the step situated at the vehicle body inside, a second pivot member (89) that supports, to the base member (83), the passenger step (81) pivotally in a direction different from direction of pivot by the first pivot member (84), and an actuator (90) that causes the passenger step (81) to pivot through the first pivot member (84). Furthermore, the passenger step (81) may be monolithically provided with a moved part (87) moved by the actuator (90).

Furthermore, in the above configuration, the step operating mechanism (82) may include a base member (83) that is supported by the vehicle and pivotally supports the passenger step (81), a pivot member (84) that supports the passenger step (81) pivotally toward a side on which at least the footrest surface (81A) becomes an inclined surface in which a portion of the step situated at the vehicle body outside is raised toward the vehicle body upper side relative to a portion of the step situated at the vehicle body inside, a moved part (87) that is pivotally supported by the base member (83) below the base member (83) and causes the passenger step (81) to pivot through the pivot member (84), and an actuator (90) that causes the passenger step (81) to pivot through the moved part (87). In addition, the actuator (90) may have a drum (98) that winds up cables (97) each connected to a respective one of the passenger steps (81) on left and right sides and each of the cables (97) may be made to pass through a lower side of the base member (83) to be joined to the moved part (87).

Moreover, in the above configuration, the step operating mechanism (82) may include a base member (83) that is supported by the vehicle and pivotally supports the passenger step (81), a pivot member (84) that supports the passenger step (81) pivotally toward a side on which at least the footrest surface (81A) becomes an inclined surface in which a portion of the step situated at the vehicle body outside is raised toward the vehicle body upper side relative to a portion of the step situated at the vehicle body inside, a moved part (87) that is pivotally supported by the base member (83) below the base member (83) and causes the passenger step (81) to pivot through the pivot member (84), and an actuator (90) that causes the passenger step (81) to pivot through the moved part (87). The actuator (90) may include a drum (98) that winds up cables (97) each connected to a respective one of the passenger steps (81) on left and right sides and each of the cables (97) may be made to pass through inside of the base member (83) in vehicle width direction to be joined to the moved part (87).

Effects of the Invention

In the present invention, the vehicle includes the step operating mechanism that changes the position of the step on which an occupant puts a foot and the control unit that changes the position of the step in response to at least one of the acceleration operation, the deceleration operation, and the turn operation of the vehicle. Thus, the occupant can be induced to take a riding posture suitable for the traveling status of the vehicle.

Furthermore, if the step operating mechanism is a mechanism that changes the height of the step for a driver and the control unit carries out control to raise the height of the step position on the opposite side to the turn direction of the vehicle, the main step can be moved to a position to which the load to the outside at the time of the turn can be easily applied, which allows the driver to easily hold on.

In addition, the driver can be induced to perform knee grip suitable for the traveling status of the vehicle if the step operating mechanism is a mechanism that causes the step for the driver to pivot and the control unit carries out step inclining control to cause the step for the driver to pivot in order for the footrest surface of the step to become an inclined surface in which a portion of the step situated at the vehicle body outside is raised toward the vehicle body upper side relative to a portion of the step situated at the vehicle body inside in response to at least any of acceleration operation, deceleration operation, and turn operation of the vehicle.

Moreover, a passenger can be induced to perform knee grip suitable for the traveling status of the vehicle if the step operating mechanism is a mechanism that causes the passenger step on which the passenger puts a foot to pivot and the control unit carries out step inclining control to cause the passenger step to pivot in order for the footrest surface of the passenger step to become an inclined surface in which a portion of the step situated at the vehicle body outside is raised toward the vehicle body upper side relative to a portion of the step situated at the vehicle body inside in response to at least any of acceleration operation, deceleration operation, and turn operation of the vehicle.

Furthermore, the passenger can be induced to take a proper riding posture according to operation in association with starting preparation if the following configuration is employed. Specifically, in the case in which the vehicle speed is zero, the control unit determines that the vehicle is in the starting preparatory state when the clutch of the vehicle is blocking power transmission and the shift stage of the vehicle is other than neutral and carries out the step inclining control when determining that the vehicle is in the starting preparatory state, and the control unit carries out control to move the passenger step to the neutral position at which the footrest surface is flat when determining that the vehicle is not in the starting preparatory state.

In addition, knee grip can be properly induced according to the vehicle body behavior at the time of traveling if the following configuration is employed. Specifically, in the case in which the vehicle speed is other than zero, the control unit carries out the step inclining control when the acceleration of the vehicle is positive acceleration equal to or higher than a predetermined value and when the acceleration of the vehicle is negative acceleration equal to or lower than a predetermined value, and carries out control to move the passenger step to the neutral position at which the footrest surface is flat when the acceleration of the vehicle falls within a predetermined range.

If the inclination angle of the footrest surface is changed according to any of the acceleration of the vehicle and the amount of turn in the step inclining control, it is possible to convey change in the behavior and the degree of change to the passenger according to the acceleration or the amount of turn.

Furthermore, if the following configuration is employed, it is possible to control the inclination of the passenger step by utilizing the pivot when the passenger step is housed while providing the passenger step that can be housed by being brought close to the vehicle body side through the pivot member. Specifically, the step operating mechanism includes the base member supported by the vehicle, the pivot member that pivotally supports the passenger step to the base member, and the actuator that causes the passenger step to pivot. Furthermore, the pivot member supports the passenger step pivotally toward the side on which at least the footrest surface becomes an inclined surface in which a portion of the step situated at the vehicle body outside is raised toward the vehicle body upper side relative to a portion of the step situated at the vehicle body inside, and the passenger step is monolithically provided with the moved part moved by the actuator.

In addition, if the pivot member allows the passenger step to pivot to the housing position and the moved part gets away from the movable part of the actuator when the passenger step pivots toward the housing position, the movable part of the actuator does not hinder the movement of the passenger step to the housing position and the passenger step can be easily operated to the housing position manually.

Moreover, the movable part of the actuator can be disposed at a position hidden from the vehicle body outside if the following configuration is employed. Specifically, the movable part of the actuator is inwardly disposed on the vehicle body relative to the base member. Furthermore, the moved part inwardly extends to the vehicle body relative to the pivot member and the passenger step extends from the pivot member to the vehicle body outside.

Furthermore, if the following configuration is employed, the passenger step can be caused to pivot also in a direction other than the direction of the step inclining control, which improves the flexibility in the pivot direction. Specifically, the step operating mechanism includes the base member supported by the vehicle, the first pivot member that supports, to the base member, the passenger step pivotally toward the side on which at least the footrest surface becomes an inclined surface in which a portion of the step situated at the vehicle body outside is raised toward the vehicle body upper side relative to a portion of the step situated at the vehicle body inside, the second pivot member that supports, to the base member, the passenger step pivotally in a direction different from the direction of pivot by the first pivot member, and the actuator that causes the passenger step to pivot through the first pivot member. Furthermore, the passenger step is monolithically provided with the moved part moved by the actuator.

Moreover, if the following configuration is employed, the left and right passenger steps can be driven by one actuator and the cables and the joining parts between the cables and the moved parts can be disposed at positions that are difficult to see from the vehicle body outside. Specifically, the step operating mechanism includes the base member that is supported by the vehicle and pivotally supports the passenger step, the pivot member that supports the passenger step pivotally toward the side on which at least the footrest surface becomes an inclined surface in which a portion of the step situated at the vehicle body outside is raised toward the vehicle body upper side relative to a portion of the step situated at the vehicle body inside, the moved part that is pivotally supported by the base member below the base member and causes the passenger step to pivot through the pivot member, and the actuator that causes the passenger step to pivot through the moved part. In addition, the actuator has the drum that winds up the cables each connected to a respective one of the passenger steps on the left and right sides and each of the cables is made to pass through the lower side of the base member to be joined to the moved part.

In addition, if the following configuration is employed, the left and right passenger steps can be driven by one actuator and the cables and the joining parts between the cables and the moved parts can be disposed at positions that are difficult to see from the vehicle body outside. Specifically, the step operating mechanism includes the base member that is supported by the vehicle and pivotally supports the passenger step, the pivot member that supports the passenger step pivotally toward the side on which at least the footrest surface becomes an inclined surface in which a portion of the step situated at the vehicle body outside is raised toward the vehicle body upper side relative to a portion of the step situated at the vehicle body inside, the moved part that is pivotally supported by the base member below the base member and causes the passenger step to pivot through the pivot member, and the actuator that causes the passenger step to pivot through the moved part.

In addition, the actuator has the drum that winds up the cables each connected to a respective one of the passenger steps on the left and right sides and each of the cables is made to pass through the inside of the base member in the vehicle width direction to be joined to the moved part.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 2 is viewed from the vehicle body left side.

FIGS. 4A-4C show diagrams depicting posture change of the pillion step by an actuator, in which FIG. 4A is a diagram showing a state with a neutral position; FIG. 4B is a diagram showing a state with a first inclination angle; and FIG. 4C is a diagram showing a state with a second inclination angle.

FIG. 9 is viewed from the vehicle body left side.

FIG. 12A-12B show diagrams depicting a pillion step of a fourth embodiment with a step operating mechanism, in which FIG. 12A is a diagram as viewed from the vehicle body left side; and FIG. 12B is a diagram as viewed from the vehicle body front side.

DETAILED DESCRIPTION OF ILLUSTRATIVE EMBODIMENTS

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Motorcycles according to embodiments of the present invention will be described below with reference to the drawings. In the description, as stated above, directions such as front, rear, left, right, upward, and downward directions are the same as those with respect to the vehicle body unless particularly noted. Furthermore, symbol FR shown in the respective diagrams indicates the vehicle body front side. Symbol UP indicates the vehicle body upper side and symbol LF indicates the vehicle body left side.

First Embodiment

Figure 1:
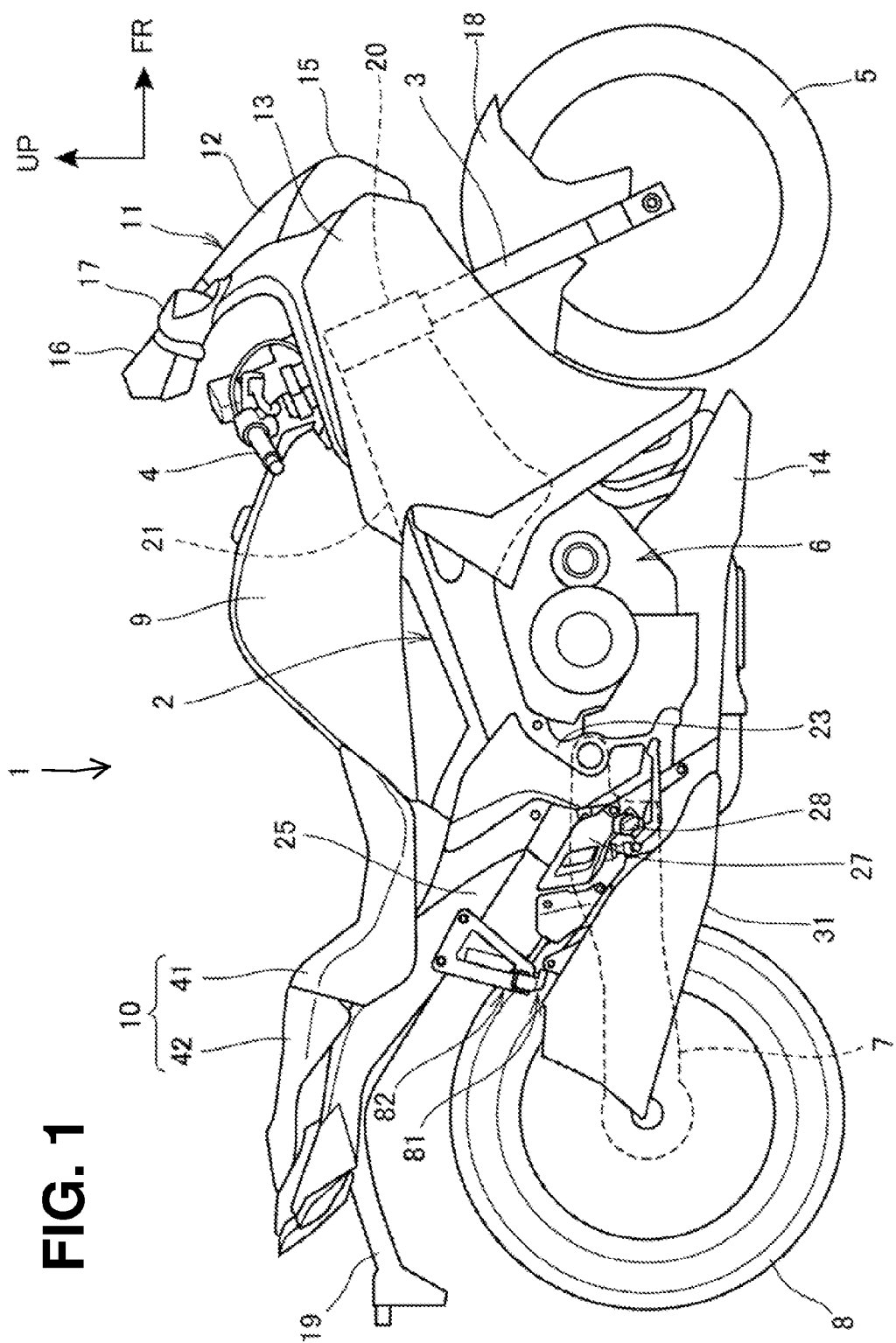
FIG. 1 is a right side view of a motorcycle according to a first embodiment of the present invention.

FIG. 1 is a right side view of a motorcycle 1 according to a first embodiment of the present invention.

This motorcycle 1 includes a vehicle body frame 2, a pair of left and right front forks 3 steerably supported by a head pipe 20 of the vehicle body frame 2, a steering handlebar 4 that is attached to the upper end parts of these front forks 3 and is disposed at the upper part of the vehicle body front part, a front wheel 5 rotatably supported by the front forks 3, and an engine 6 (power unit) supported by the vehicle body frame 2 at substantially the center of the vehicle body. The motorcycle 1 further includes a swingarm 7 (also referred to as "rear fork") supported by the vehicle body frame 2 vertically swingably, a rear wheel 8 rotatably supported by the rear end part of this swingarm 7, a fuel tank 9 disposed at the upper part of the vehicle body frame 2, an occupant seat 10 disposed on the rear side of this fuel tank 9, and a vehicle body cowl 11 covering the vehicle body.

The vehicle body frame 2 includes a pair of left and right main frames 21 extending from the head pipe 20 toward the rear lower side, a pair of left and right pivot frames 23 that are connected to the rear parts of the main frames 21 and extend downward, and a rear frame 25 extending from the upper parts of the pivot frames 23 toward the rear upper side.

The front upper part of the engine 6 is supported by the main frames 21, and the rear part of the engine 6 is supported by the pivot frames 23. Thereby, the engine 6 is supported below the main frames 21 and in front of the pivot frames 23. The engine 6 is a four-cylinder engine provided with a transmission mechanism and a clutch mechanism (not shown). The shift stage can be changed among shift stages from first to sixth for example by the transmission mechanism according to gearshift operation by a rider (driver), and power transmission to the rear wheel 8 (drive wheel) can be blocked/connected (disconnected/connected) by the clutch mechanism according to clutch operation by the rider.

By the pair of left and right pivot frames 23, the front end part of the swingarm 7 is pivotally supported and a pair of left and right main steps 28 (rider steps) on which the rider (driver) puts feet are supported with the intermediary of main step holders 27.

Furthermore, the fuel tank 9 is supported on the main frames 21 and stores the fuel to be supplied to the engine 6. The occupant seat 10 is supported on the rear frame 25.

The vehicle body cowl 11 is formed as a full cowl type covering substantially the whole of the vehicle body. It includes a front cowl 12 covering the vehicle body front part, a pair of left and right side cowls 13 that are provided consecutively with this front cowl 12 and cover the left and right sides of the vehicle body, and an under cowl 14 covering the vehicle body lower part.

A headlight 15 is provided on the front surface of the front cowl 12. A windscreen (windshield) 16 is attached to the upper part of the front cowl 12. Left and right mirrors 17 are attached to the left and right sides of the front cowl 12.

The motorcycle 1 further includes, as other cover members, a front fender 18 covering the upper side of the front wheel 5, a rear fender 19 covering the upper side of the rear wheel 8, and an exhaust muffler 31 that is disposed on the right side of the rear wheel 8 and emits an exhaust gas of the engine 6.

The motorcycle 1 is formed as a two-seater vehicle, which a rider and a passenger (fellow passenger) can ride. The occupant seat 10 is formed as a seat having a front seat 41 (rider riding part) on which the rider sits, and a rear seat 42 (passenger riding part) on which the passenger sits.

A pair of left and right pillion steps 81 (passenger steps) on which the passenger puts feet are pivotally supported with the intermediary of a step operating mechanism 82 by the rear frame 25.

In tandem traveling, the passenger often moves to a large extent due to acceleration, deceleration, or turn according to operation by the rider. As one of riding techniques of the passenger, there is a state in which the passenger lightly clamps the waist part of the rider by both knees (hereinafter, referred to as knee grip).

It is difficult for the passenger to always perform knee grip during tandem traveling. Therefore, the passenger is required to perform knee grip according to the status. However, it is difficult for the passenger to accurately anticipate the operation of the rider and therefore the passenger needs to perform knee grip while relying on experience.

The riding posture of the passenger also affects the driving of the vehicle. Therefore, the rider can enjoy the tandem traveling more if the motion of the passenger can be properly suppressed.

Therefore, in the present configuration, the step operating mechanism 82 that can induce the passenger to perform knee grip according to the traveling status of the vehicle is provided and control of the step operating mechanism 82 is carried out. The left and right pillion steps 81 and step operating mechanisms 82 are symmetrical between the left and right sides.

In the following, one of the pillion steps 81 and one of the step operating mechanisms 82 will be described.

Figure 2:
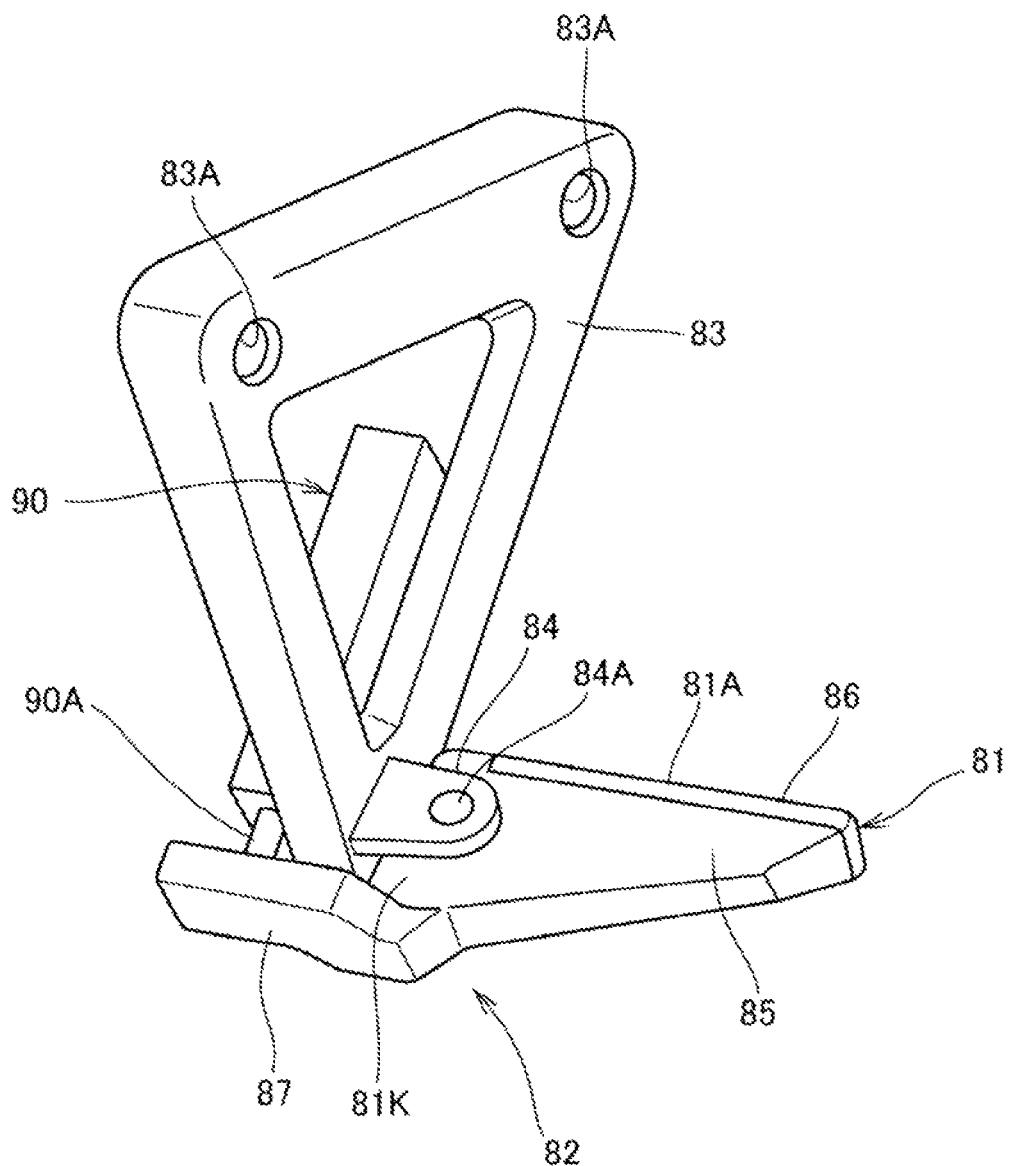
FIG. 2 is a perspective view showing a left pillion step with a step operating mechanism.
Figure 3:
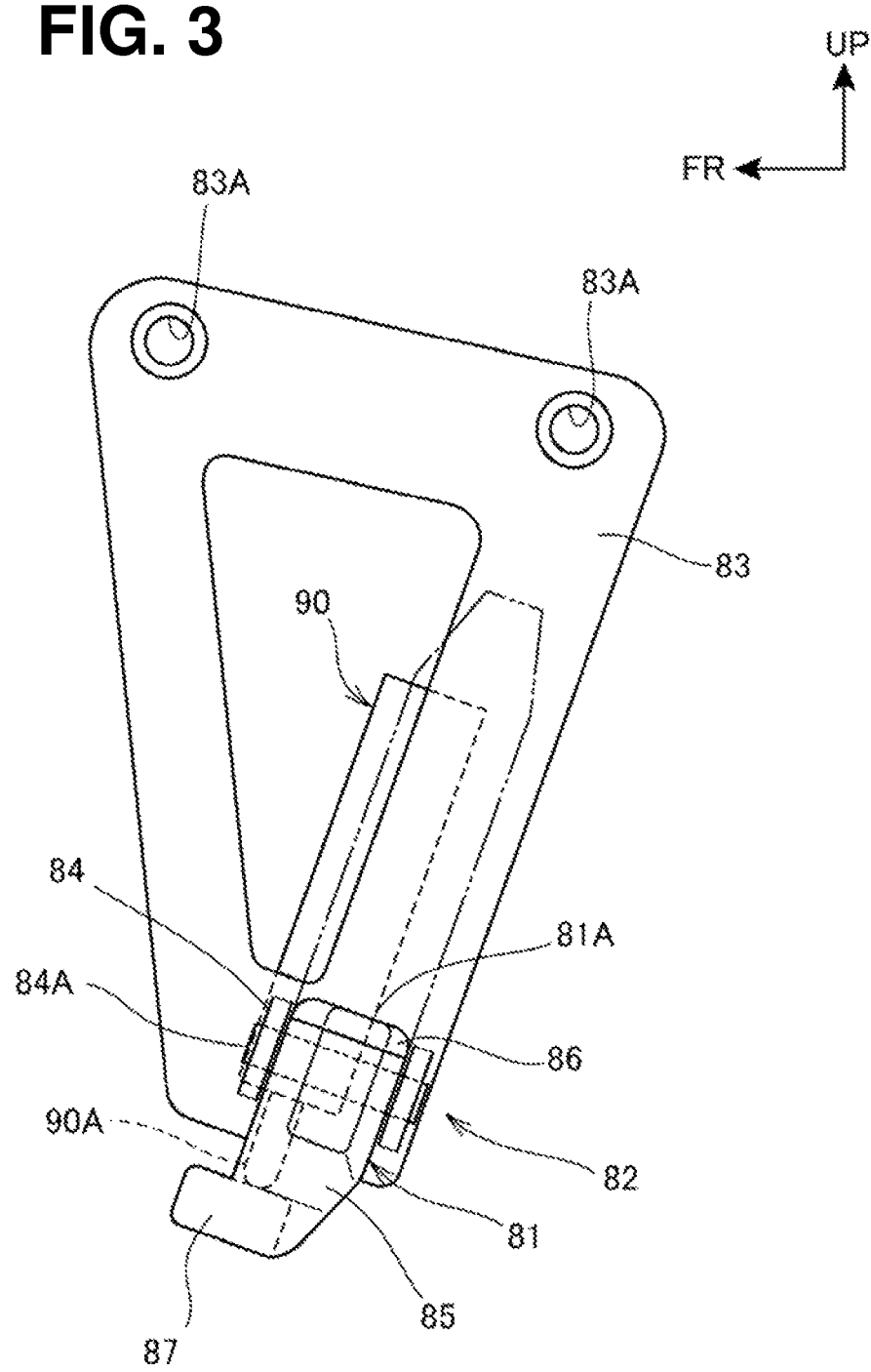
FIG. 3 is a diagram obtained when

FIG. 2 is a perspective view showing the left pillion step 81 with the step operating mechanism 82. FIG. 3 is a diagram obtained when FIG. 2 is viewed from the vehicle body left side.

The step operating mechanism 82 monolithically includes a base member 83 supported by the rear frame 25 and a pivot member 84 that extends from the base member 83 toward the outside in the vehicle width direction and pivotally supports the pillion step 81 with the intermediary of a pivot shaft 84A.

The base member 83 is composed of a metal material such as an aluminum alloy and is formed into a triangular frame shape in side view. The base member 83 pivotally supports the pillion step 81 with the intermediary of the pivot member 84 at the corner part at the lowermost position in the triangle.

In other words, the base member 83 is formed into a frame shape extending downward, rearward, and so forth from the vehicle body frame 2 (rear frame 25, in the present embodiment) toward the position that is the most suitable for the passenger to put a foot on. In the base member 83, plural through-holes 83A are formed at intervals in a region corresponding to the top side of the triangle and the base member 83 is fixed to the rear frame 25 by fastening members (not shown) through these through-holes 83A.

The pivot member 84 is formed as a pivotal support part that supports the pillion step 81 pivotally to at least a neutral position at which a footrest surface 81A of the pillion step 81 is set to a horizontal surface extending outward in the vehicle width direction when the vehicle body stands uptight (see FIG. 2) and an inclined position at which the footrest surface 81A is set to an inclined surface in which a portion of the step situated at the vehicle body outside is raised toward the vehicle body upper side relative to a portion of the step situated at the vehicle body inside when the vehicle body stands uptight.

The pillion step 81 has a step part 85 that is pivotally supported by the pivot member 84 with the intermediary of the pivot shaft 84A and extends outward in the vehicle width direction at the neutral position and the inclined position, and includes a footrest part 86 forming the footrest surface 81A on which the passenger puts a foot at the upper part of this step part 85 monolithically or as a separate body. At a base end part 81K (equivalent to the inside end part in the vehicle width direction) of the step part 85, an arm member 87 (moved part) extending toward the vehicle body inside at the neutral position and the inclined position is monolithically provided.

As shown in FIG. 2, by setting the pillion step 81 at the neutral position, at which the footrest surface 81A is set to a horizontal surface, it becomes possible for the passenger sitting on the rear seat 42 to easily put a foot on the footrest surface 81A. Furthermore, at such neutral position, the passenger can easily step foot on the footrest surface 81A when riding or getting down the motorcycle 1, and it is also possible to sufficiently ensure easiness of riding and alighting. The neutral position is equivalent to the use position when the passenger rides the vehicle in conventional motorcycles. The neutral position of the present embodiment is equivalent to a horizontal position at which the footrest surface 81A of the pillion step 81 is set to a horizontal plane. However, the neutral position may be a position at which the footrest surface 81A is set to a slightly-inclined surface.

As shown in FIG. 3, the pivot shaft 84A, which defines the pivot axis line of the pillion step 81, is supported with such a posture as to be along the vehicle body front-rear direction and be slightly inclined to have the lowered rear part. Because the pivot shaft 84A is along the vehicle body front-rear direction, when the pillion step 81 pivots upward from the neutral position shown by a solid line in FIG. 3 based on the pivot shaft 84A, the footrest surface 81A becomes an inclined surface in which a portion of the step situated at the vehicle body outside is raised toward the vehicle body upper side relative to a portion of the step situated at the vehicle body inside. Furthermore, the inclination angle thereof can be arbitrarily changed by changing the amount of pivot (pivot angle).

When the pillion step 81 pivots to a vertical position based on the pivot shaft 84A, the footrest surface 81A of the pillion step 81 substantially abuts against the base member 83 and the further pivot of the pillion step 81 is restricted. This position is equivalent to a housing position at which the whole of the pillion step 81 is close to the base member 83 and is folded to the inside in the vehicle width direction. That is, when the pillion step 81 is not used, setting the pillion step 81 at this housing position can suppress the extension of the pillion step 81 toward the outside in the vehicle width direction. Furthermore, The pillion step 81 can be made to pivot and move to the housing position by an occupant manually. In FIG. 3, the pillion step 81 at the housing position is shown by a two-dot chain line.

Furthermore, as shown in FIG. 3, because the pivot shaft 84A is inclined to have the lowered rear part, the pillion step 81 pivots along a straight line that is orthogonal to the pivot shaft 84A and extends toward the rear upper side when being viewed from the vehicle body lateral side. Thus, when being at the housing position, the pillion step 81 can be disposed along the rear edge part of the base member 83 extending toward the rear upper side and is allowed to have appearance integrated with the base member 83.

The step operating mechanism 82 includes an actuator 90 that causes the pillion step 81 to pivot. The actuator 90 is a linear actuator having a movable part 90A that can linearly move. As shown in FIGS. 2 and 3, the actuator 90 is attached on the vehicle body inside of the base member 83 along the rear edge of the base member 83 and is disposed to allow the movable part 90A to advance downward and retreat.

Figure 4A:
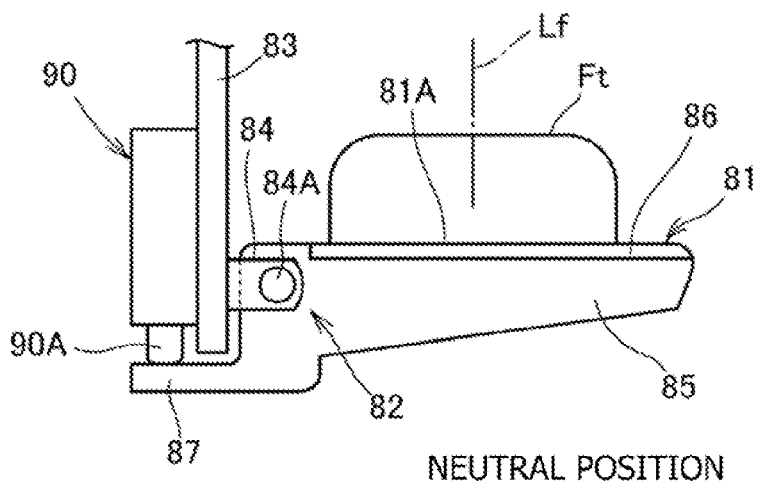
Figure 4B:
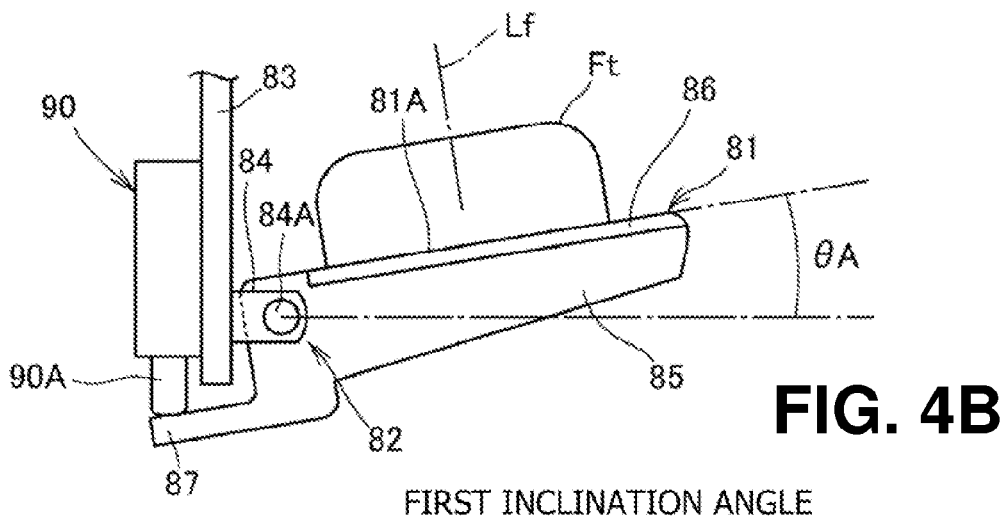
Figure 4C:
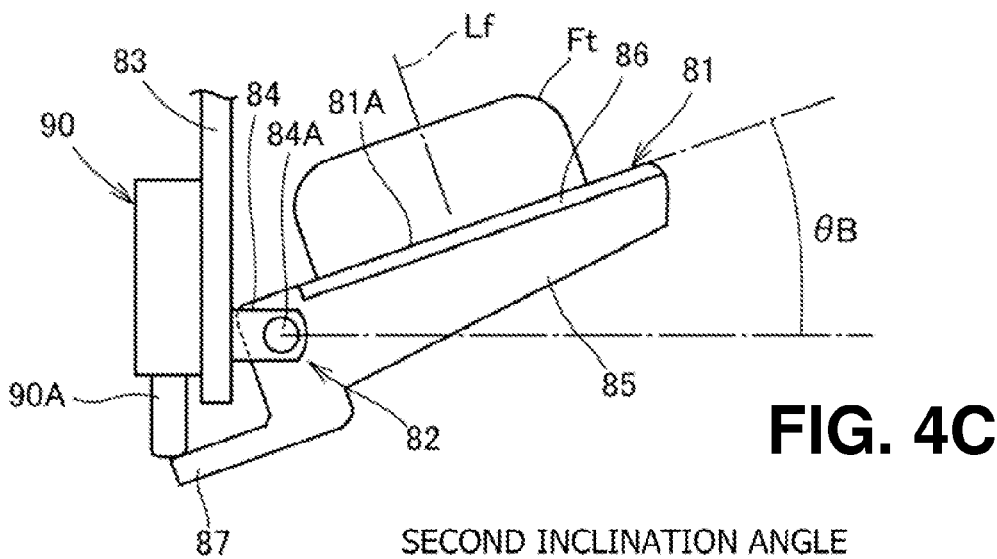

FIG. 4A-4C show diagrams depicting the posture change of the pillion step 81 by the actuator 90. FIG. 4A shows a state with the neutral position. FIG. 4B shows a state with a first inclination angle θA. FIG. 4C shows a state with a second inclination angle θB. It may be noted that θB>θA.

As shown in FIGS. 4A-4C, the movable part 90A of the actuator 90 can set the pillion step 81 at each of the neutral position (see FIG. 4A), the first inclination angle θA (see FIG. 4B), and the second inclination angle θB (see FIG. 4C) by abutting against the upper surface of the arm member 87 of the pillion step 81 and pressing the arm member 87 downward.

The first and second inclination angles θA and θB are angles at which the footrest surface 81A is an inclined surface in which the position of the vehicle body outside (a portion of the step situated at the vehicle body outside) is raised toward the vehicle body upper side relative to the position of the vehicle body inside (a portion of the step situated at the vehicle body inside) when being viewed with the posture when the vehicle body stands upright. The first and second inclination angles θA and θB are rotation angles from the neutral position based on the pivot axis and satisfy a relationship of 90° (angle of the housing position)>second inclination angle θB>first inclination angle θA. For example, the second inclination angle θB is 20° and the first inclination angle θA is 10°.

Step inclining control may be employed in which a force to cause the pillion step 81 to pivot is so generated that the force to incline the pillion step 81 becomes larger depending on the difference between a target value according to the acceleration and the present position.

As shown in FIGS. 4A to 4C, a foot of a passenger Ft is put on the pillion step 81. The center axis line of the region from the foot Ft to a knee is represented by Lf.

As shown in FIG. 4A, at the neutral position, the footrest surface 81A is horizontal. Therefore, the region Lf from the foot Ft put on the footrest surface 81A to the knee stands substantially vertically. In contrast, at the first inclination angle θA, the footrest surface 81A becomes the above-described inclined surface. Thus, as shown in FIG. 4B, the region Lf from the foot Ft to the knee is so inclined that its part at a higher level is closer to the inside in the vehicle width direction. That is, the passenger can be induced to a knee grip state in which the passenger clamps the waist part of the rider by the knees.

At the second inclination angle θB, the inclination angle is larger than the first inclination angle θA. Therefore, the knee can be guided to the inside in the vehicle width direction to a larger extent and it becomes possible to induce the knee grip more or induce somewhat stronger knee grip. The first inclination angle θA and the second inclination angle θB may be set to angles suitable for the knee grip as appropriate.

Figure 5:
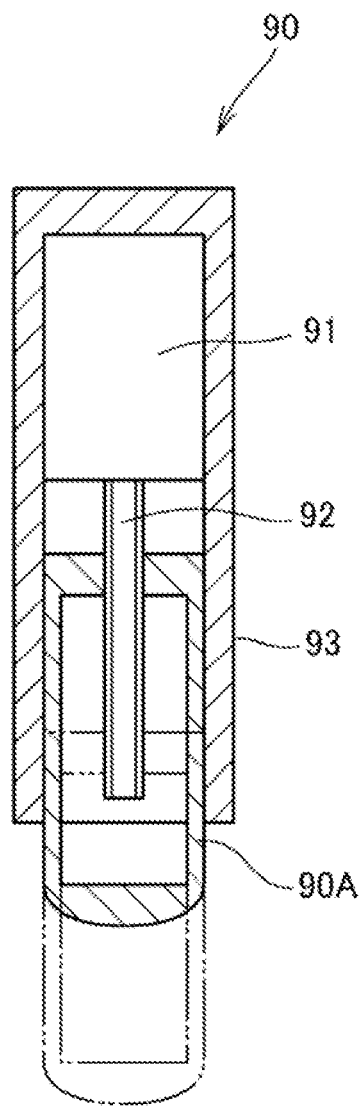
FIG. 5 is a diagram showing the internal structure of the actuator.

FIG. 5 is a diagram showing the internal structure of the actuator 90.

The actuator 90 is a linear motion mechanism that linearly moves the movable part 90A by using a motor 91 and a ball screw 92. Specifically, the actuator 90 has a structure in which the motor 91 whose rotation is controlled by an ECU 100 (described later) and the ball screw 92 joined to the rotating shaft of the motor 91 are housed in a cylindrical actuator case 93 whose lower end is opened and the movable part 90A is screwed to this ball screw 92. The movable part 90A can move in the axial direction of the ball screw 92 by being guided by the inner surface of the actuator case 93 and is so provided as to be incapable of moving in the rotation direction of the ball screw 92.

Such configuration allows the movable part 90A to advance and retreat in the axial direction of the ball screw 92 according to the rotation of the motor 91. By controlling the amount of rotation of this motor 91 and the rotation direction, the pillion step 81 can be moved to each of the neutral position, the position of the first inclination angle θA, and the position of the second inclination angle θB shown in FIGS. 4A-4C.

Figure 6:
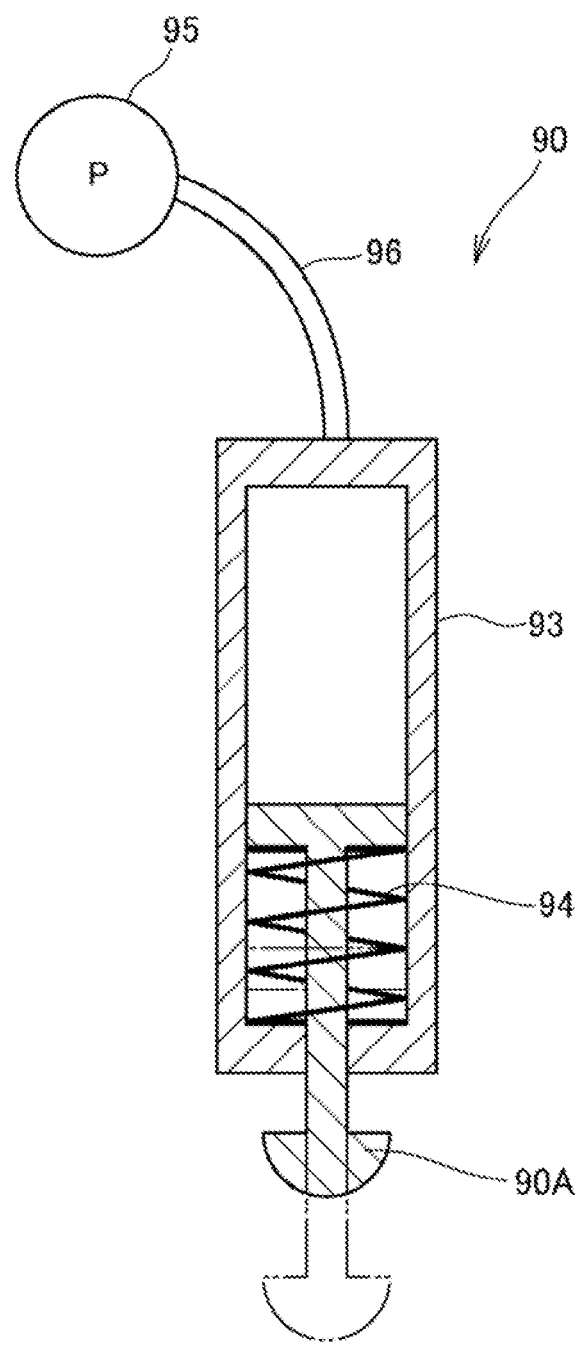
FIG. 6 is a diagram showing the internal structure of the actuator according to a modification example.

FIG. 6 shows a modification example of the actuator 90.

The actuator 90 shown in FIG. 6 is a so-called hydraulic cylinder and includes an actuator case 93 configuring a cylinder part forming a hydraulic chamber, the movable part 90A functioning as a piston slidable relative to the actuator case 93, and a biasing member 94 that biases the movable part 90A toward the retraction side. Furthermore, the actuator 90 includes a pump 95 that supplies a hydraulic pressure to the hydraulic chamber of the actuator case 93. Under such configuration, the pump 95 is driven by the ECU 100 (described later). A hydraulic pressure is supplied into the actuator case 93 via a hose 96 and the movable part 90A moves according to this hydraulic pressure against the biasing force of the biasing member 94. This can cause the pillion step 81 to pivot.

The actuator 90 may be one having a mechanism other than the ball screw mechanism and the hydraulic cylinder and a publicly-known actuator can be widely applied.

Figure 7:
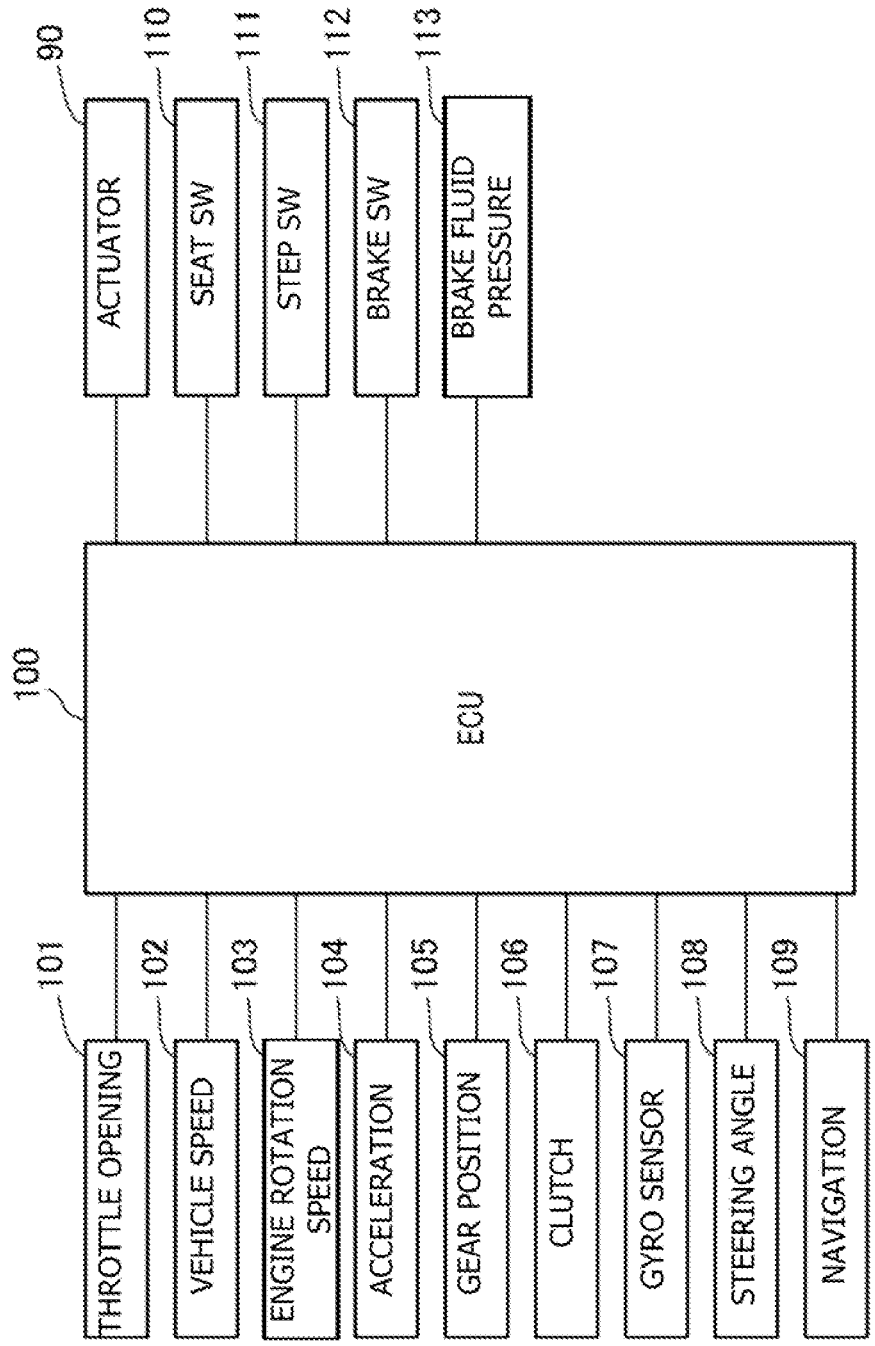
FIG. 7 is a block diagram showing an ECU that controls the actuators with the peripheral configuration.

FIG. 7 is a block diagram showing the ECU (electronic control unit) 100, which controls the actuators 90, with the peripheral configuration.

The ECU 100 is an electrical component unit composed of a computer and various kinds of electronic components and functions as a control unit that controls the respective parts of the vehicle body including the actuators 90.

As shown in FIG. 7, besides the actuators 90, sensors, switches, and so forth that detect information on the respective parts of the vehicle body are connected to the ECU 100.

Specifically, the following components are connected to the ECU 100: a throttle opening sensor 101 that detect the degree of opening of a throttle operated by a rider (throttle opening); a vehicle speed sensor 102 that detects the vehicle speed; an Ne sensor 103 that detects the engine rotation speed; an acceleration sensor 104 that detects the acceleration; a gear position sensor 105 that detects the present shift stage; a clutch detecting switch 106 that detects ON (power transmission is blocked)/OFF (power is transmitted) of the clutch mechanism; a gyro sensor 107 (tilt angle sensor) for detecting the tilt of the vehicle body (roll angle) and so forth; a steering angle sensor 108 that detects the steering angle of the front wheel 5 (or handlebar 4); a navigation device 109; a seat switch 110 that detects whether or not a passenger sits on the rear seat 42; a step switch 111 that detects whether or not the pillion steps 81 are at a predetermined position (neutral position, in the present embodiment); a brake switch 112 that detects whether or not the rider is carrying out brake operation; and a brake fluid pressure detecting sensor 113 that detects the brake fluid pressure.

The navigation device 109 is a device that includes a GPS (global positioning system) unit and has a map display function of displaying map information of a surrounding area including the present location based on the present location acquired by the GPS unit, a route guide function of performing a route guide from the present location to a destination set in advance, and so forth.

The map information used by the navigation device 109 generally includes road information including nodes and links indicating a road network. In recent years, navigation devices having the following functions have come to appearance: a function of detecting, in advance, traveling information on whether or not the road on the traveling forward side curves and so forth by using this road information; and a function of detecting, in advance, whether or not the traveling forward side is in a situation involving change in the vehicle body behavior (e.g. the existence of sharp curve, temporary stop site, and railroad crossing) based on additional information added in advance.

The navigation device 109 of the present embodiment has a function of detecting whether or not the traveling forward side is in a situation involving change in the vehicle body behavior in advance and notifying the ECU 100 of the detected information.

The brake fluid pressure detecting sensor 113 detects whether or not the brake is being actuated based on the brake fluid pressure, i.e. whether or not the brake is being operated. Therefore, by using the results of both the brake switch 112 and the brake fluid pressure detecting sensor 113, the accuracy of the detection of whether or not the brake is being operated is enhanced compared with the case of using only the result of either one. FIG. 7 shows part of the configurations connected to the ECU 100. In addition, the ECU 100 carries out engine control (intake control and ignition control) and so forth.

It is possible that the seat switch 110 will react to baggage. In view of such a situation, an ON/OFF function based on a manual switch may be provided so that the step inclining control may be prevented.

Figure 8:
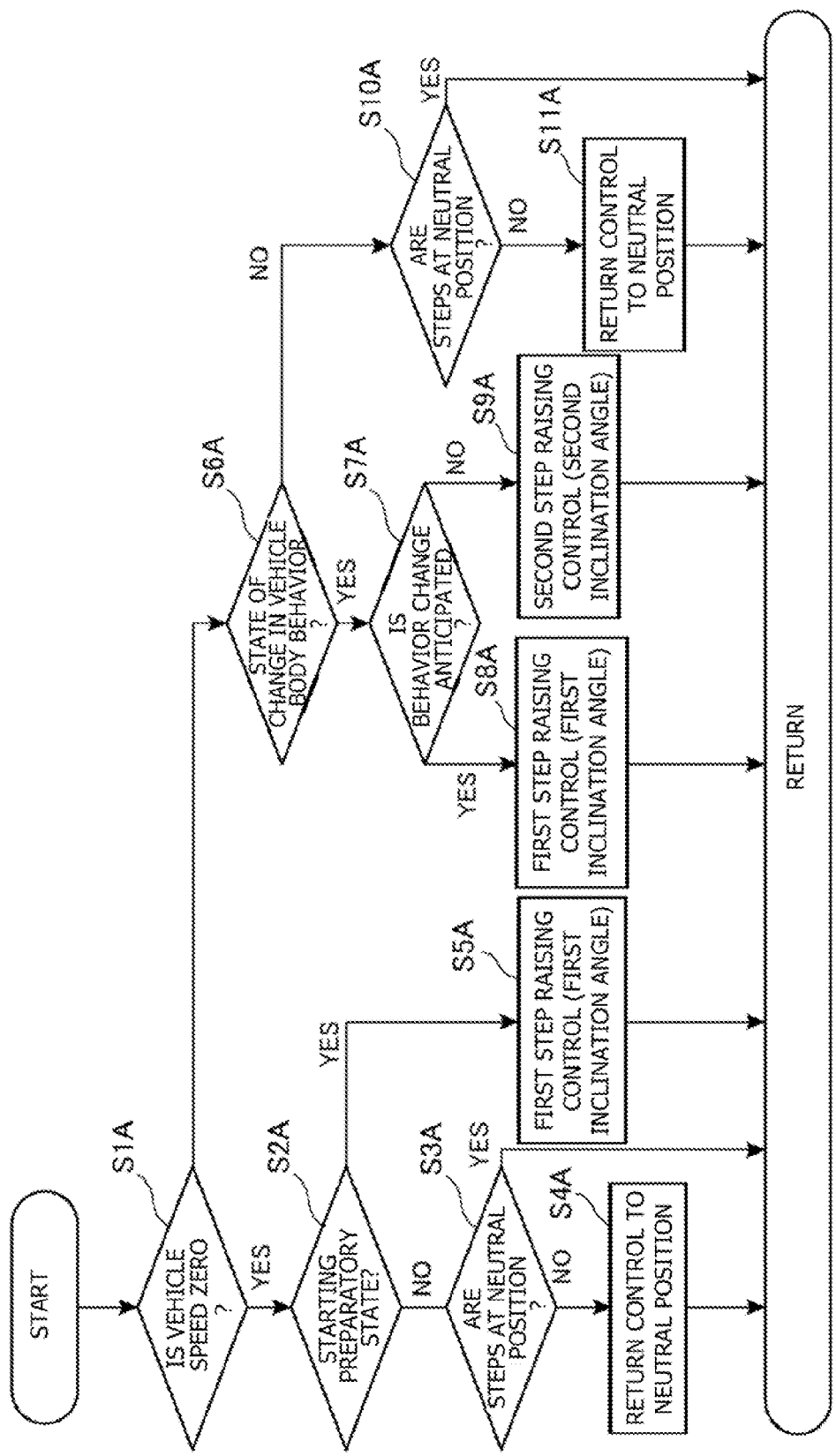
FIG. 8 is a flowchart showing control of the pillion steps.

FIG. 8 is a flowchart showing the control of the pillion steps 81. The flowchart shows processing executed when the ECU 100 has determined that a passenger is currently riding the motorcycle 1 based on a detection result of the seat switch 110. However, if the seat switch 110 is not provided, this processing may be repeatedly executed at a predetermined interrupt cycle.

In a step S1A, the ECU 100 determines whether or not the vehicle speed is zero based on a detection result of the vehicle speed sensor 102. If the vehicle speed is zero, the ECU 100 executes processing of determination of whether or not the motorcycle 1 is in a starting preparatory state (step S2A). In this step S2A, the ECU 100 determines whether or not a predetermined condition with which the motorcycle 1 can be determined to be in the starting preparatory state is satisfied. Specifically, based on detection results of the clutch detecting switch 106, the gear position sensor 105, the brake switch 112, and so forth, the ECU 100 determines that the motorcycle 1 is in the starting preparatory state if the clutch is ON (power transmission is blocked) and the shift stage is other than neutral and the brake is being operated.

If determining that the motorcycle 1 is not in the starting preparatory state, the ECU 100 determines whether or not the pillion steps 81 are at the neutral position based on a detection result of the step switch 111 (step S3A). If the pillion steps 81 are not at the neutral position, the ECU 100 carries out return control in which the actuators 90 are driven to return the pillion steps 81 to the neutral position (step S4A). In the return control step, control is carried out to return the pillion steps 81 to the neutral position while smoothly changing the angular velocity of the pillion steps 81 so that the passenger may be prevented from being given a sense of discomfort. For example, velocity control by which the angular velocity changes in a sinusoidal manner is carried out. On the other hand, if the pillion steps 81 are at the neutral position, the ECU 100 temporarily ends this processing and thereafter executes the processing of the step S1A.

If determining in the step S2A that the motorcycle 1 is in the starting preparatory state, the ECU 100 carries out first step raising control (step S5A). This first step raising control is step inclining control in which the actuators 90 are driven to incline the pillion steps 81 to the first inclination angle θA. Specifically, the pillion steps 81 are made to pivot to the first inclination angle θA in a stepwise manner. Inclining the pillion steps 81 to the first inclination angle θA can induce the passenger who puts feet on the pillion steps 81 to perform knee grip and induce the passenger to take a riding posture suitable for behavior change. In addition, by causing the pillion steps 81 to pivot in a stepwise manner, the movement of the pillion steps 81 can be clearly conveyed to the passenger and the passenger can be urged to pay attention to starting.

If the vehicle speed is not zero, the ECU 100 determines whether or not the motorcycle 1 is in a state of change in the vehicle body behavior (step S6A). The "state of change in the vehicle body behavior" in the step S6A includes both a "state in which change in the vehicle body behavior is anticipated" and "vehicle body behavior is currently changing." If determining that the motorcycle 1 is in the "state of change in the vehicle body behavior," the ECU 100 makes transition to a step S7A and determines whether or not the motorcycle 1 is in the "state in which change in the vehicle body behavior is anticipated."

Specifically, the change in the vehicle body behavior can be determined by using any of the throttle opening, change in the vehicle speed or the engine rotation speed, the acceleration, the tilt of the vehicle body (roll angle), the roll rate (the amount of change in the roll angle per predetermined time), the steering angle of the front wheel 5, the status of brake control, and specific information from the navigation device 109 (information or notification indicating that the traveling forward side is in a situation involving change in the vehicle body behavior, specifically e.g. information or notification indicating the existence of sharp curve, temporary stop site, and railroad crossing).

In the present embodiment, in order to determine whether or not the motorcycle 1 is in the "state in which change in the vehicle body behavior is anticipated," the ECU 100 detects whether or not acceleration operation by the rider is carried out through the throttle opening sensor 101 and detects whether or not brake operation by the rider is carried out through the brake switch 112. Furthermore, the ECU 100 detects whether or not shift-down operation by the rider is carried out through the gear position sensor 105 and detects whether or not specific information from the navigation device 109 (e.g. information or notification indicating the existence of sharp curve, temporary stop site, and railroad crossing) is received.

In other words, the ECU 100 detects whether or not any of acceleration operation, deceleration operation, and turn operation is carried out or whether or not specific information is received from the navigation device 109. When detecting any kind of operation or information, the ECU 100 determines that the motorcycle 1 is in the "state in which change in the vehicle body behavior is anticipated."

Furthermore, in order to determine whether or not "the vehicle body behavior is currently changing," the ECU 100 executes the following processing.

The ECU 100 determines whether the motorcycle 1 is accelerating (speed is increasing) or decelerating (speed is decreasing) based on the acceleration detected by the acceleration sensor 104. At the time of acceleration, the ECU 100 carries out acceleration correction in which the acceleration generated after a minute time is estimated from the accelerator opening and the engine rotation speed. At the time of deceleration, the ECU 100 carries out deceleration correction in which the negative acceleration (deceleration) generated after a minute time is estimated based on at least any of the brake switch 112, the brake fluid pressure, the accelerator opening, and the engine rotation speed. The ECU 100 employs the acceleration or deceleration after the correction as a determination value of the vehicle body behavior. Then, the ECU 100 determines that "the vehicle body behavior is currently changing" if the determination value surpasses a predefined threshold that is a determination reference value of change in the vehicle body behavior, i.e. if the acceleration or deceleration after the minute time is equal to or higher than a predetermined value.

Furthermore, the ECU 100 detects the roll angle of the vehicle body and the roll rate through the gyro sensor 107 and detects change in the steering angle through the steering angle sensor 108. Then, based on them, the ECU 100 obtains a determination value of behavior change in the turn direction. The ECU 100 determines that "the vehicle body behavior is currently changing" if this determination value surpasses a predefined threshold that is a determination reference value of change in the vehicle body behavior, i.e. also in the case of a turn equal to or larger than a predetermined turn. In this manner, whether or not "the vehicle body behavior is currently changing" can be accurately determined.

In the case of estimating the acceleration generated after the minute time from the accelerator opening and the engine rotation speed, it is preferable to employ the following way because the acceleration changes depending on the magnitude of the traveling resistance. Specifically, characteristic data of the traveling resistance is held in advance and the traveling resistance is identified in advance based on the immediately-previous accelerator opening, the engine rotation speed, vehicle speed change, and so forth. Then, the acceleration is obtained from the excess driving force in consideration of the characteristic data of this identified traveling resistance. For example, as the characteristic data of the traveling resistance, data made by describing characteristics of the traveling resistance, the engine rotation speed, the accelerator opening, and the acceleration when the driving force is indicated on the ordinate and the speed is indicated on the abscissa is stored, and the acceleration can be obtained based on this data.

Referring back to FIG. 8, if determining that the motorcycle 1 is in the "state in which change in the vehicle body behavior is anticipated," the ECU 100 carries out the first step raising control (step S8A). If determining that "the vehicle body behavior is currently changing," the ECU 100 carries out second step raising control (step S9A). This second step raising control is control of keeping on driving the actuators 90 toward the larger side of the inclination angle of the pillion steps 81 to keep on applying a force to the passenger. The maximum value of the inclination angle of the pillion steps 81 in this case is set to the second inclination angle θB and excessive inclination of the pillion steps 81 is suppressed. This can induce knee grip to a larger extent and induce the passenger to take a riding posture suitable for the behavior change.

If determining that the motorcycle 1 is not in the state of behavior change, the ECU 100 determines whether or not the pillion steps 81 are at the neutral position based on a detection result of the step switch 111 (step S10A). If the pillion steps 81 are not at the neutral position, the ECU 100 carries out the return control in which the actuators 90 are driven to return the pillion steps 81 to the neutral position (step S11A). Also in this return control, control to return the pillion steps 81 to the neutral position while smoothly changing the angular velocity of the pillion steps 81 so that the passenger may be prevented from being given a sense of discomfort, specifically e.g. velocity control by which the angular velocity changes in a sinusoidal manner, is carried out.

On the other hand, if the pillion steps 81 are at the neutral position, the ECU 100 temporarily ends this processing and thereafter executes the processing of the step S1A. The above is the control of the pillion steps 81.

As described above, in the present embodiment, the motorcycle 1 includes the step operating mechanisms 82 that change the positions of the pillion steps 81. Furthermore, in response to at least any of acceleration operation, deceleration operation, and turn operation to the motorcycle 1, the ECU 100 carries out the step inclining control to change the positions of the pillion steps 81 (passenger steps) in such a manner that the footrest surfaces 81A of the pillion steps 81 each become an inclined surface in which a portion of the step situated at the vehicle body outside is raised toward the vehicle body upper side relative to a portion of the step situated at the vehicle body inside. Therefore, the passenger can be induced to perform knee grip according to the behavior of the motorcycle 1 and be informed of behavior change of the motorcycle 1. This can induce the passenger to take a proper riding posture suitable for the traveling status of the motorcycle 1, which facilitates the driving by the rider. Consequently, more enjoyable driving and tandem traveling are enabled.

Furthermore, in the case in which the vehicle speed is zero, the ECU 100 determines that the motorcycle 1 is in the starting preparatory state when the clutch mechanism possessed by the motorcycle 1 is in the state of blocking power transmission and the shift stage of the motorcycle 1 is other than neutral. When determining that the motorcycle 1 is in the starting preparatory state, the ECU 100 carries out the step inclining control. When determining that the motorcycle 1 is not in the starting preparatory state, the ECU 100 carries out the return control to move the pillion steps 81 to the neutral position, at which the footrest surface 81A is flat. This can induce the passenger to take a proper riding posture suitable for starting preparation.

In addition, in the case in which the vehicle speed is other than zero, the ECU 100 carries out the step inclining control when the acceleration of the motorcycle 1 is positive acceleration equal to or higher than a predetermined value and when the acceleration is negative acceleration equal to or lower than a predetermined value. When the acceleration of the motorcycle 1 falls within a predetermined range, the ECU 100 carries out the return control to move the pillion steps 81 to the neutral position, at which the footrest surface 81A is flat. Thus, knee grip can be properly induced according to the vehicle body behavior in the traveling.

Moreover, the ECU 100 determines whether or not the motorcycle 1 is in the "state in which change in the vehicle body behavior is anticipated" and determines whether or not "the vehicle body behavior is currently changing." Furthermore, the ECU 100 makes the step inclining control different according to the respective states. Thus, the passenger can be induced to take a proper riding posture according to the respective states. In addition, the ECU 100 carries out control to incline the pillion steps 81 to the first inclination angle θA in a stepwise manner if change in the vehicle body behavior is anticipated, and carries out control to incline the pillion steps 81 beyond the first inclination angle θA if the vehicle body behavior is currently changing. Thus, the passenger can be urged to pay attention to future behavior change if change in the vehicle body behavior is anticipated. In addition, knee grip can be induced to a larger extent if the vehicle body behavior is currently changing.

Furthermore, in the acceleration detection, the acceleration generated after a minute time is estimated from the accelerator opening and the engine rotation speed at the time of acceleration. Thus, the pillion steps 81 can be properly controlled according to change in the vehicle body behavior due to the acceleration.

In addition, in the acceleration detection, the negative acceleration (deceleration) generated after a minute time is estimated based on at least any of the brake switch 112, the brake fluid pressure, the accelerator opening, and the engine rotation speed at the time of deceleration. Thus, the pillion steps 81 can be properly controlled according to change in the vehicle body behavior due to the deceleration.

Moreover, the step operating mechanism 82 includes the base member 83 supported by the motorcycle 1, the pivot member 84 that pivotally supports the pillion step 81 to the base member 83, and the actuator 90 that causes the pillion step 81 to pivot. The pivot member 84 supports the pillion step 81 pivotally toward the side on which at least the footrest surface 81A becomes an inclined surface in which a portion of the step situated at the vehicle body outside is raised toward the vehicle body upper side relative to a portion of the step situated at the vehicle body inside. In the pillion step 81, the arm member 87 (moved part) moved by the movable part 90A of the actuator 90 is monolithically provided. Therefore, it is possible to control the inclination of the pillion step 81 by utilizing the pivot when the pillion step 81 is housed while providing the pillion step 81 that can be housed by being brought close to the vehicle body side through the pivot member 84.

In addition, in the present embodiment, as shown in FIG. 3, the pivot member 84 can cause the pillion step 81 to pivot to the housing position, and the arm member 87 of the pillion step 81 gets away from the movable part 90A of the actuator 90 when the pillion step 81 is caused to pivot toward the housing position. Therefore, the movable part 90A of the actuator 90 does not hinder the movement of the pillion step 81 to the housing position and the pillion step 81 can be easily operated to the housing position manually.

Furthermore, the movable part 90A of the actuator 90 is disposed on the vehicle body inside relative to the base member 83 and the arm member 87 extends to the vehicle body inside relative to the pivot member 84. In addition, the pillion step 81 extends from the pivot member 84 to the vehicle body outside. Thus, the movable part 90A of the actuator 90 can be disposed at a position hidden from the vehicle body outside.

Furthermore, the structure to cause the pillion step 81 to pivot by the actuator 90 can be simply configured by the arm member 87 extending inward relative to the pivot member 84 and the pillion step 81 extending from the pivot member 84 to the vehicle body outside. Moreover, the actuator 90 is disposed on the vehicle body inside of the base member 83. Thus, the actuator 90 can be disposed at a position that is difficult to see from the vehicle body outside.

Second Embodiment

Figure 9:
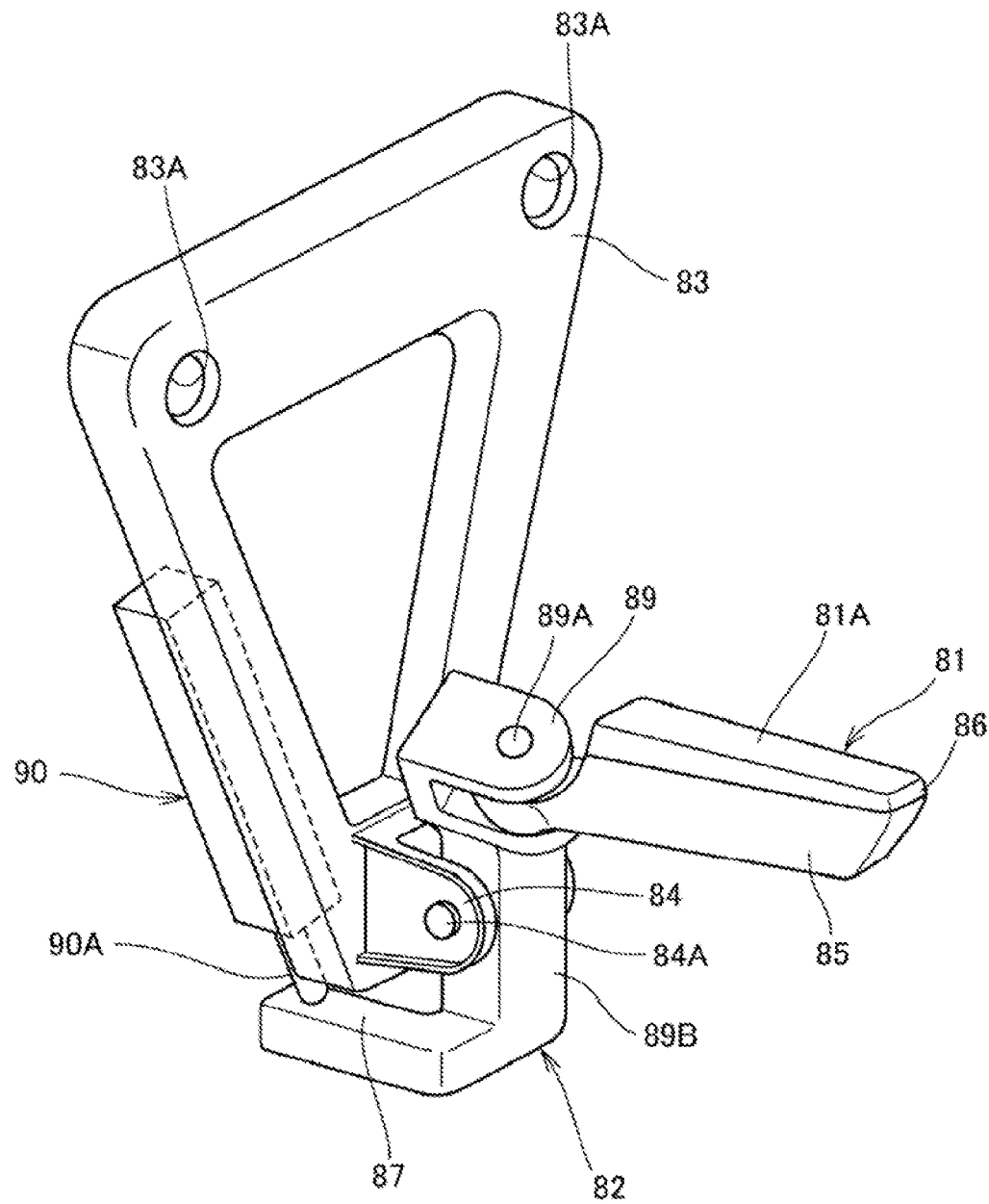
FIG. 9 is a perspective view showing a pillion step of a second embodiment with a step operating mechanism.
Figure 10:
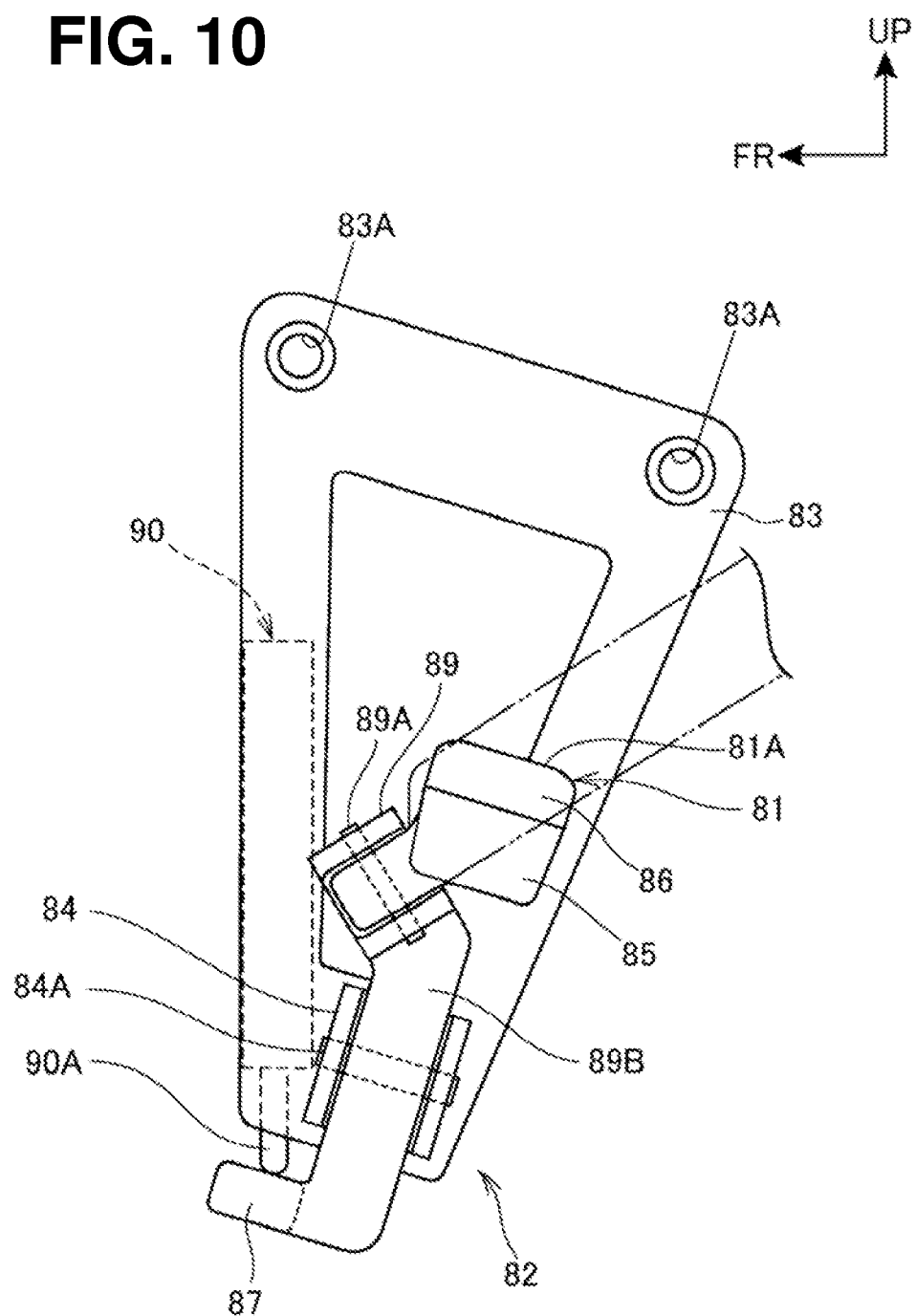
FIG. 10 is a diagram obtained when

FIG. 9 is a perspective view showing a pillion step 81 of a second embodiment with a step operating mechanism 82. FIG. 10 is a side view as viewed from the vehicle body left side.

The second embodiment is different from the first embodiment in that the step operating mechanism 82 includes, in addition to the above-described pivot member 84 (hereinafter, referred to as the first pivot member), a second pivot member 89 that supports the pillion step 81 pivotally in a direction different from the direction of the pivot by the first pivot member 84. Members corresponding to the respective members in the first embodiment are shown with the same symbols and differences between the first embodiment and the second embodiment will be described.

The second pivot member 89 is provided monolithically with a support part 89B pivotally supported by the first pivot member 84 and pivotally supports the base end part of a step part 85. Furthermore, an arm member 87 (moved part) extending toward the vehicle body inside when the pillion step 81 is at the neutral position or an inclined position is provided monolithically with the support part 89B.

The second pivot member 89 is formed as a pivotal support part that supports the pillion step 81 pivotally substantially along the nearly front-rear direction of the motorcycle 1. Specifically, as shown in FIG. 10, a pivot shaft 89A of the second pivot member 89 is inclined to have the lowered rear part at a steeper angle than a pivot shaft 84A of the first pivot member 84 in the vehicle body side view, and the pillion step 81 can pivot rearward based on this pivot shaft 89A. Through the rearward pivot, the pillion step 81 abuts against a base member 83 and can be manually operated to a housing position shown by a two-dot chain line in FIG. 10.

An actuator 90 is attached on the vehicle body inside of the base member 83 along the front edge of the base member 83 and is disposed to allow a movable part 90A to advance downward and retreat. The movable part 90A abuts against the upper surface of the arm member 87 and presses the arm member 87 downward. This can set the pillion step 81 at the above-described neutral position and positions of the first inclination angle θA and the second inclination angle θB through the first pivot member 84.

Also in the present embodiment, the pillion step 81 can be so supported as to be capable of pivoting by the actuator 90 toward the side on which at least a footrest surface 81A becomes an inclined surface in which a portion of the step situated at the vehicle body outside is raised toward the vehicle body upper side relative to a portion of the step situated at the vehicle body inside. Therefore, the same control of the pillion steps 81 as the first embodiment can be applied and various kinds of effects such as the effect that the passenger can be induced to perform knee grip according to the traveling status of the motorcycle 1 can be achieved as with the first embodiment.

Furthermore, the step operating mechanism 82 includes, in addition to the first pivot member 84, the second pivot member 89 supporting, to the base member 83, the pillion step 81 pivotally in a direction different from the direction of the pivot by the first pivot member 84. Therefore, the pillion step 81 can be caused to pivot also in a direction other than the direction of the step inclining control, which improves the flexibility in the pivot direction. Due to this, the pivot direction when the step is housed can be arbitrarily set. Thus, even when a vehicle body constitutional component exists around the pillion step 81, the pillion step 81 can housed with avoidance of this component.

In particular, in the present embodiment, the second pivot member 89 supports the pillion step 81 pivotally substantially along the nearly front-rear direction of the motorcycle 1. Therefore, in the case in which a vehicle body constitutional component exists in the vicinity of the upper side of the pillion step 81 and it is difficult to move the pillion step 81 upward substantially vertically, the pillion step 81 can be tilted rearward and be compactly housed.

Third Embodiment

Figure 11:
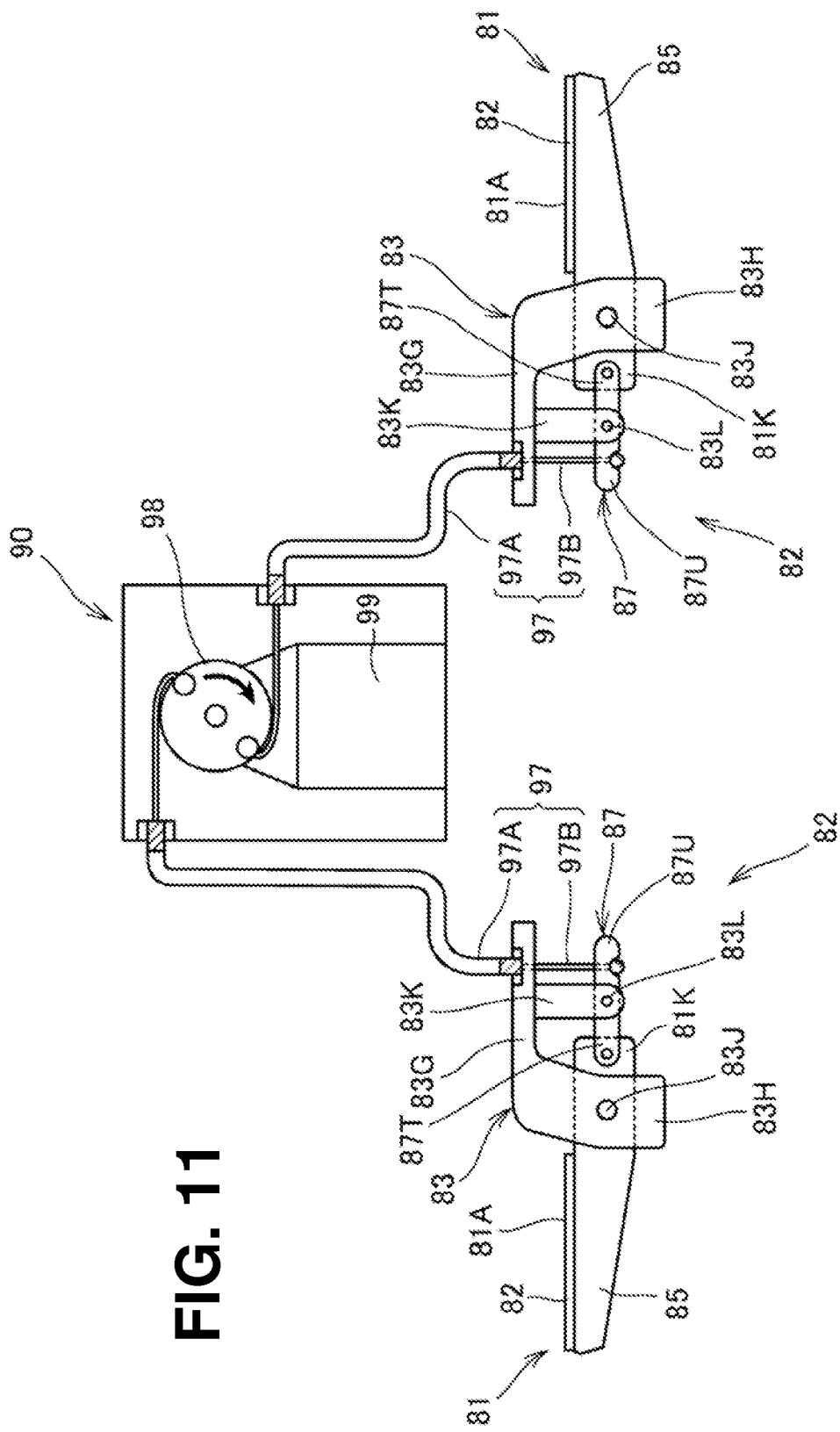
FIG. 11 is a diagram showing pillion steps of a third embodiment with step operating mechanisms.

FIG. 11 is a diagram showing pillion steps 81 of a third embodiment with step operating mechanisms 82.

In the third embodiment, an actuator 90 and the step operating mechanism 82 are different from those in the first and second embodiments. Members corresponding to the respective members in the first and second embodiments are shown with the same symbols and different points will be described.

The actuator 90 is formed as a winding system including a drum 98 that winds up a pair of cables 97 and a motor 99 that rotationally drives the drum 98. This actuator 90 is fixed to the rear frame 25 or the pivot frame 23.

Base members 83 of the step operating mechanisms 82 are each formed into a substantially L-shape in front view that extends outward in the vehicle width direction from the rear frame 25 and then extends downward. The parts extending outward in the vehicle width direction from the rear frame 25 are referred to as left-right extending parts 83G, and the parts extending downward from the tips of the left-right extending parts 83G will be referred to as vertical extending parts 83H.

The vertical extending parts 83H pivotally support the pillion steps 81 with the intermediary of pivot shafts 83J extending along the vehicle body front-rear direction. This supports the left and right pillion steps 81 pivotally from the neutral position toward the side on which a footrest surface 81A becomes an inclined surface in which a portion of the step situated at the vehicle body outside is raised toward the vehicle body upper side relative to a portion of the step situated at the vehicle body inside. That is, the vertical extending parts 83H each function as the above-described pivot member 84 supporting the pillion step 81 pivotally toward the side on which the footrest surface 81A becomes an inclined surface in which a portion of the step situated at the outside is raised toward the vehicle body upper side relative to a portion of the step situated at the vehicle body inside.

Furthermore, pivot members 83K extending downward on the inside relative to the vertical extending parts 83H in the vehicle width direction are provided monolithically with the left-right extending parts 83G The pivot members 83K have pivot shafts 83L parallel to the pivot shafts 83J and support arm parts 87 (moved parts) vertically swingably with the intermediary of the pivot shafts 83L.

The arm parts 87 are each formed as a separate body from the pillion step 81. The arm parts 87 each extend to the left and right sides along the vehicle width direction based on the pivot shaft 83L. Vehicle-width-direction outside end parts 87T are swingably joined to base end parts 81K of the pillion steps 81 and thereby the arm parts 87 are integrated with the pillion steps 81. The pillion steps 81 each pivot in association with the swing of the arm member 87, with the pivot shaft 83J serving as the fulcrum.

One of the pair of cables 97 possessed by the actuator 90 is joined to a vehicle-width-direction inside end part 87U of the arm member 87. Specifically, the cable 97 penetrates the left-right extending part 83G of the base member 83 from the upper side of the left-right extending part 83G and is routed into a space made below the left-right extending part 83G and inside the vertical extending part 83H in the vehicle width direction, to be joined to the arm member 87. The other cable 97 is joined to the arm member 87 corresponding to the other pillion step 81.

Each cable 97 has a wire cable structure in which an inner cable 97B slides inside an outer cable 97A forming the outer tube. The tips of the outer cables 97A are fixed to the left-right extending parts 83G and the tips of the inner cables 97B are fixed to the arm parts 87.

With the above configuration, when the pair of cables 97 are wound up by the drum 98 of the actuator 90, the left and right arm parts 87 swing and the left and right pillion steps 81 pivot through the respective arm parts 87 from the neutral position toward the side on which the footrest surface 81A becomes an inclined surface in which a portion of the step situated at the vehicle body outside is raised toward the vehicle body upper side relative to a portion of the step situated at the vehicle body inside. Due to this, through control of the actuator 90 by the ECU 100, control of the pillion steps 81 similar to that of the first embodiment can be applied. Therefore, various kinds of effects such as the effect that the passenger can be induced to perform knee grip according to the traveling status of the motorcycle 1 can be achieved as with the first embodiment.

Furthermore, in the actuator 90 of the present embodiment, the pair of cables 97 to cause the left and right pillion steps 81 to pivot are wound up by the common drum 98. Thus, the left and right pillion steps 81 can be driven by the one actuator 90. This eliminates the need to dispose the actuator 90 near each of the left and right pillion steps 81.

Moreover, the arm parts 87 that are pivotally supported by the base members 83 below the base members 83 and allow the pillion steps 81 to pivot through the pivot members 84 are provided, and each of the cables 97 is made to pass through the lower side of the base member 83 and is joined to a respective one of the arm parts 87. Therefore, the cables 97 and the joining parts between the cables 97 and the arm parts 87 can be disposed at positions that are difficult to see from the vehicle body outside. In the present embodiment, the case in which the cables 97 are made to penetrate the base members 83 is described. However, the cables 97 may be routed to the lower side of the respective base members 83 without the penetration.

Fourth Embodiment

FIG. 12 shows diagrams depicting a pillion step 81 of a fourth embodiment with a step operating mechanism 82.

Figure 12A:
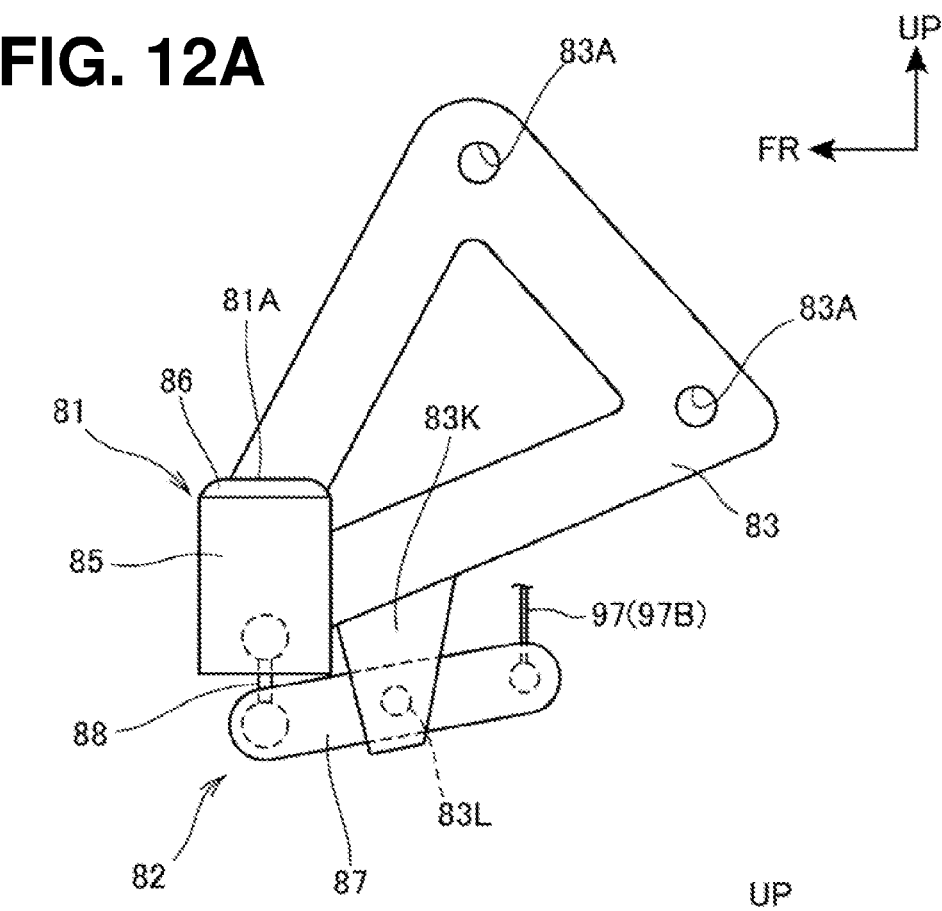
Figure 12B:
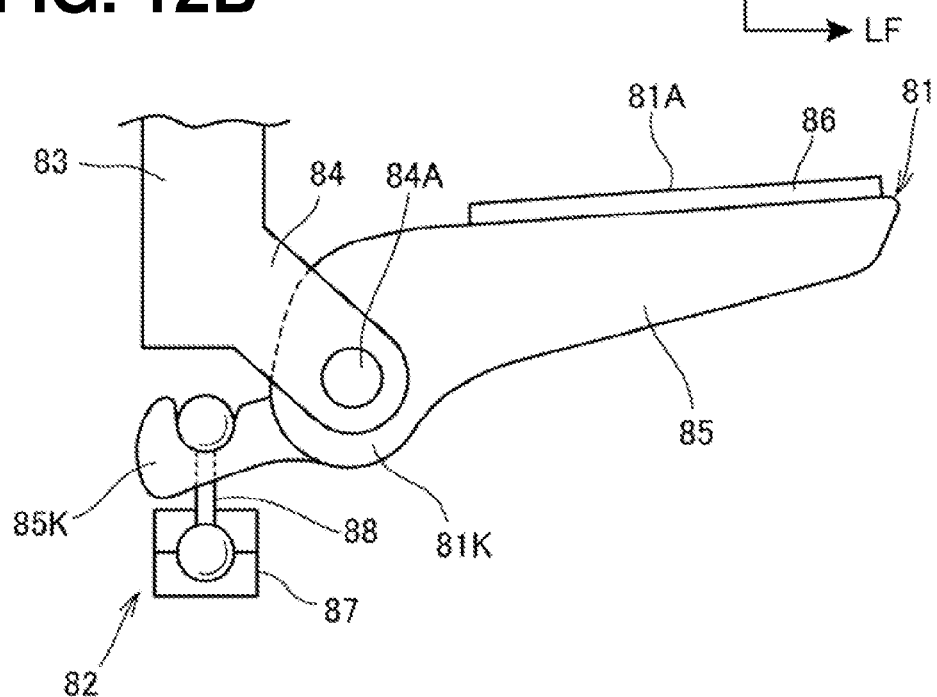

FIG. 12A is a diagram as viewed from the vehicle body left side and FIG. 12B is a diagram as viewed from the vehicle body front side.

In the fourth embodiment, an actuator 90 is the same as that in the third embodiment and the step operating mechanism 82 is different from that in the third embodiment. Members corresponding to the respective members in the above respective embodiments are shown with the same symbols and different points will be described.

A base member 83 of the step operating mechanism 82 is formed into a triangular frame shape in side view and pivotally supports the pillion step 81 with the intermediary of a pivot member 84 at the corner part at the lowermost position in the triangle similarly to the first embodiment. Due to this, the pillion step 81 is supported pivotally from the neutral position toward the side on which a footrest surface 81A becomes an inclined surface in which a portion of the step situated at the vehicle body outside is raised toward the vehicle body upper side relative to a portion of the step situated at the vehicle body inside.

Furthermore, a pivot member 83K extending downward from the base member 83 on the rear side relative to the pillion step 81 is provided monolithically with the base member 83. This pivot member 83K supports an arm member 87 vertically swingably with the intermediary of a pivot shaft 83L extending along the vehicle width direction.

This arm member 87 is formed as a separate body from the pillion step 81. The arm member 87 extends along the front-rear direction based on the pivot shaft 83L and is disposed below the base member 83. The front end part of this arm member 87 extends to a base end part 81K of the pillion step 81 in the vehicle body side view (see FIG. 12A) and is joined to an extension part 85K (see FIG. 12B) extending from the base end part 81K of the pillion step 81 to the inside in the vehicle width direction with the intermediary of a universal joint 88. Thereby, the arm member 87 is integrated with the pillion step 81. The pillion step 81 pivots based on the above-described pivot shaft 84A in association with the swing of this arm member 87.

One of a pair of cables 97 (FIG. 11) possessed by the actuator 90 is joined to the rear end of the arm member 87. The cable 97 passes through the inside of the base member 83 in the vehicle width direction and is routed from the upper side toward the lower side and its tip is joined to the rear end of the arm member 87.

With the above configuration, when the cables 97 are wound up by the actuator 90, the rear end part of the arm member 87 moves upward. Thus, the pillion step 81 pivots through the arm member 87 from the neutral position toward the side on which a footrest surface 81A becomes an inclined surface in which a portion of the step situated at the vehicle body outside is raised toward the vehicle body upper side relative to a portion of the step situated at the vehicle body inside. Due to this, control of the pillion steps 81 similar to that of the first embodiment can be applied and various kinds of effects such as the effect that the passenger can be induced to perform knee grip according to the traveling status of the motorcycle 1 can be achieved as with the first embodiment.

Furthermore, each of the cables 97 of the actuator 90 is made to pass through the inside of the base member 83 in the vehicle width direction to be joined to the arm member 87. Therefore, the cables 97 and the joining parts between the cables 97 and the arm parts 87 can be disposed at positions that are difficult to see from the vehicle body outside.

Moreover, the arm parts 87 each extend along the front-rear direction from the base end part 81K of the pillion step 81 and are each swingably supported by the base member 83, and the cables 97 are each joined to the end part on the opposite side to the pillion step 81 in the arm member 87. Thus, the arm parts 87 can be disposed at positions that are difficult to see from the vehicle body outside.

Fifth Embodiment

In a fifth embodiment, a case in which the present invention is applied to a motorcycle 1 different from the above-described motorcycle 1 will be shown.

Figure 13:
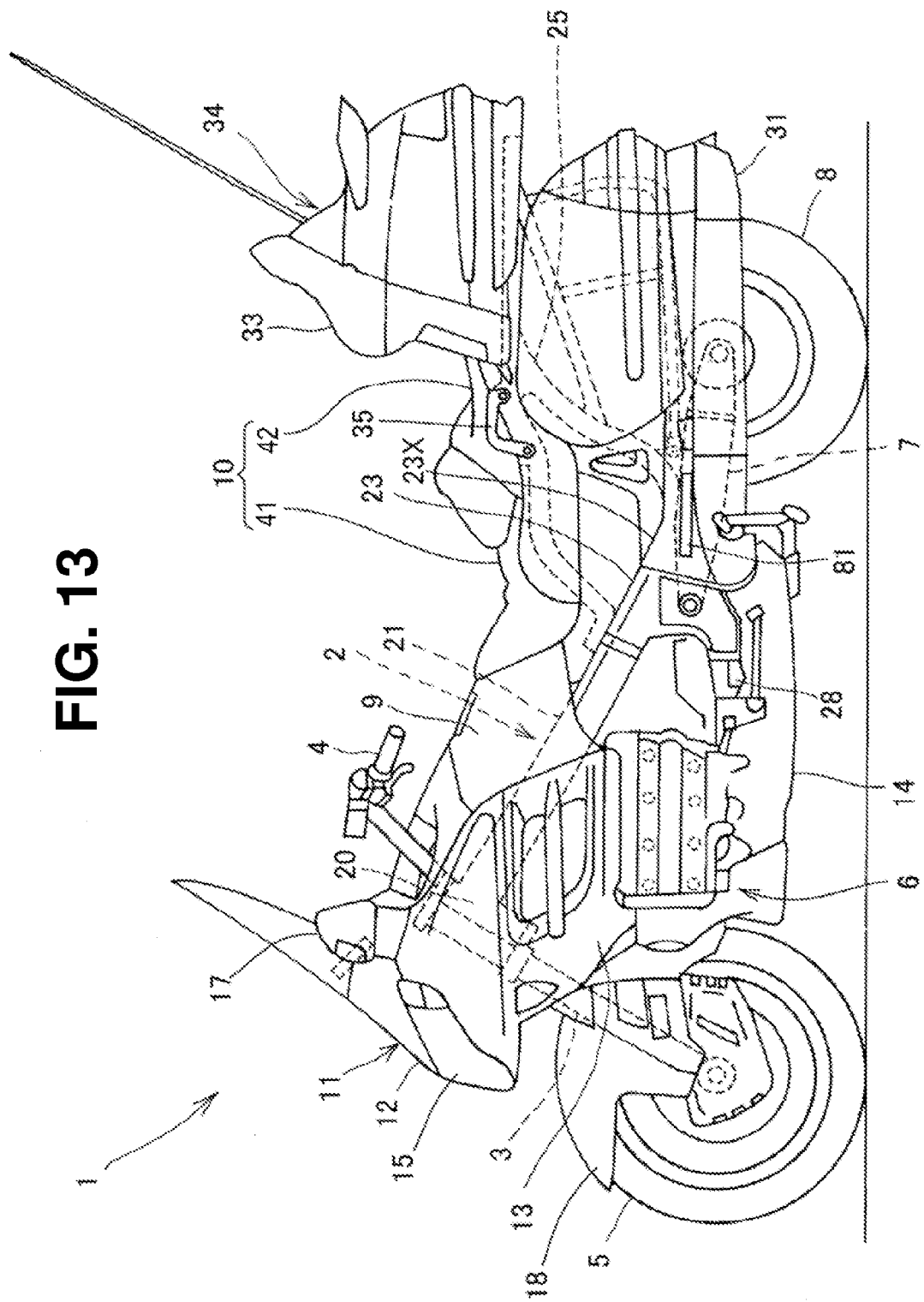
FIG. 13 is a left side view of a motorcycle according to a fifth embodiment.

FIG. 13 is a left side view of the motorcycle 1 according to the fifth embodiment.

This motorcycle 1 is a large-size vehicle equipped with a horizontally-opposed six-cylinder engine as an engine 6. A rear seat 42 on which a passenger sits is provided on the rear side of a front seat 41 on which a rider sits, with a raised height. A backrest part 33 for the passenger is provided and a housing box 34 is provided on the back surface of the backrest part 33. Grab rails 35 grasped by the passenger are provided on the left and right sides of the rear seat 42. Members corresponding to the respective members in the above embodiments are shown with the same symbols and different points will be described.

Figure 14:
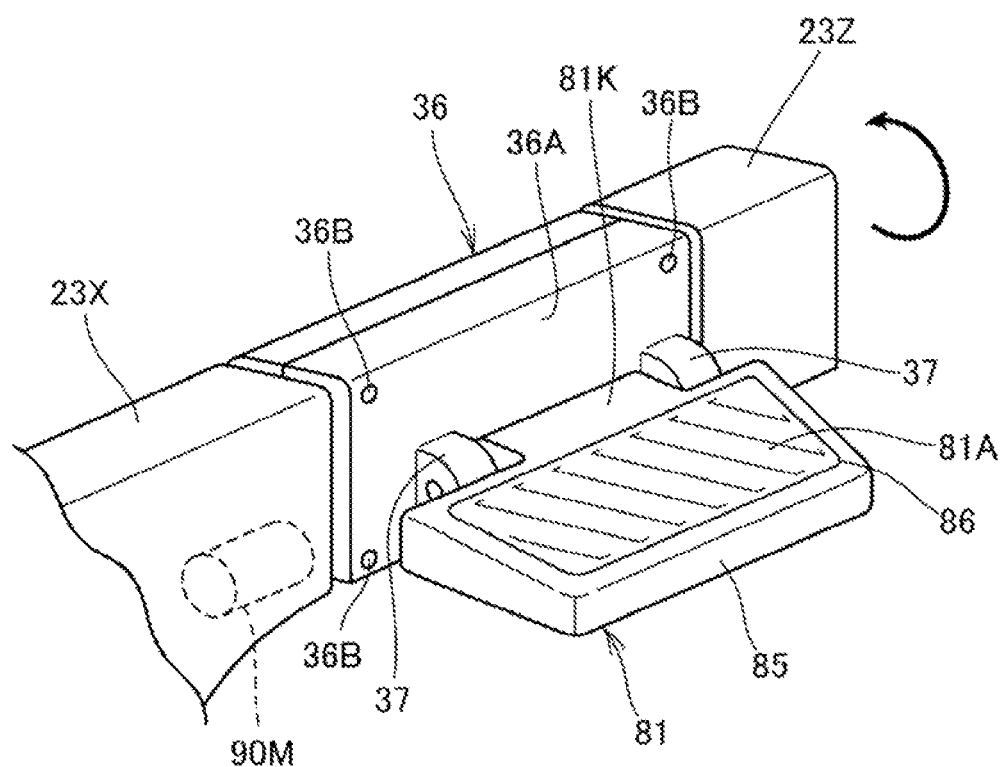
FIG. 14 is a perspective view showing a left pillion step with the peripheral configuration.

FIG. 14 is a perspective view showing a left pillion step 81 with the peripheral configuration.

The pillion step 81 is vertically pivotally attached to a side surface 36A, on the outside in the vehicle width direction, of a step support body 36 continuous with the rear side of a frame part 23X joined to the rear part of a pivot frame 23, with the intermediary of a pair of front and rear support parts 37.

The pillion step 81 has a step part 85 that has a flat plate shape and has a base end part 81K pivotally supported by the pair of front and rear support parts 37. At the upper part of this step part 85, a footrest part 86 forming a footrest surface 81A on which the whole of a foot of the passenger can be placed is made.

By opening this pillion step 81 toward the vehicle body outside through the pair of front and rear support parts 37, the pillion step 81 is held at the neutral position (see FIG. 14). Conversely, when the pillion step 81 is closed toward the vehicle body inside, the pillion step 81 is folded to the inside in the vehicle width direction to be held at a housing position. Manual operation is possible as the operation of the pillion step 81 in this case.

Figure 15:
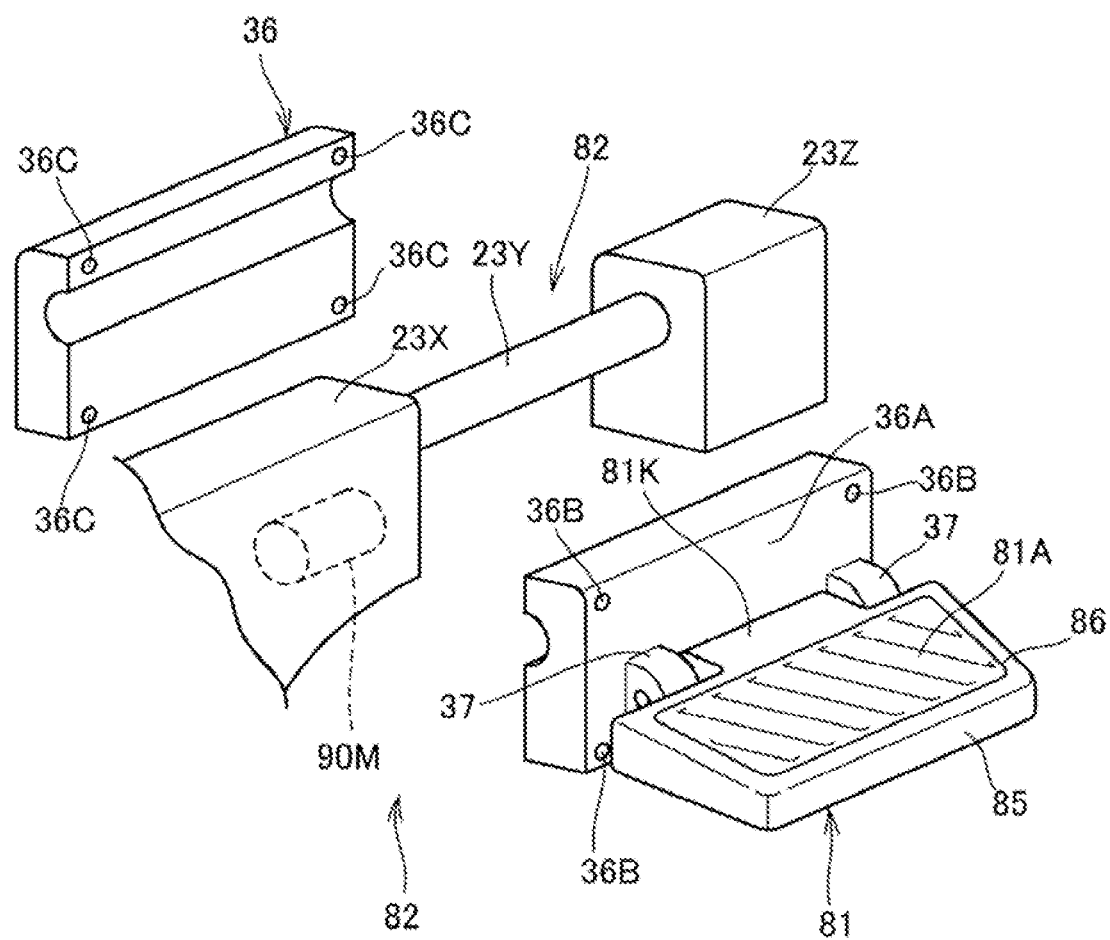
FIG. 15 is an exploded perspective view of FIG. 14.

FIG. 15 is an exploded perspective view of FIG. 14.

As shown in FIG. 15, in the present embodiment, the step support body 36 is formed as a left-right split type. By mounting the step support body 36 in such a manner that a pivot shaft 23Y extending rearward from the frame part 23X is sandwiched, the step support body 36 is supported pivotally through the pivot shaft 23Y. In the diagram, symbol 36B denotes a through-hole through which a fastening member (e.g. fastening bolt) for fastening the step support body 36 of the left-right split type passes through. Symbol 36C denotes a female screw to which the fastening member made to pass through the through-hole 36B is fastened. Furthermore, in the diagram, symbol 23Z is a frame-fixed part that is joined to the rear end of the pivot shaft 23Y and is fixed to a vehicle body frame 2.

The pivot shaft 23Y extends along the vehicle body front-rear direction. Therefore, the pillion step 81 supported by the step support body 36 can be supported pivotally from the neutral position toward the side on which the footrest surface 81A becomes an inclined surface in which a portion of the step 81 situated at the vehicle body outside is raised toward the vehicle body upper side relative to a portion of the step 81 situated at the vehicle body inside.

That is, the step support body 36 serves as both the above-described base member 83 supported by the frame part 23X forming part of the vehicle body frame 2 and the above-described pivot member 84 that pivotally supports the pillion step 81 with the intermediary of the pivot shaft 23Y.

An actuator 90 that causes the pillion step 81 to pivot has a motor 90M disposed in the step support body 36 and rotationally drives the step support body 36 through a converting mechanism (not shown, e.g., eccentric cam) that converts the rotation of this motor 90M to a rotational force of the step support body 36. Due to this, through driving control of the motor 90M by the ECU 100, the same control of the pillion steps 81 as the first embodiment can be applied. This can achieve various kinds of effects such as the effect that the passenger can be induced to perform knee grip according to the traveling status of the motorcycle 1 as with the first embodiment.

Furthermore, the frame part 23X forming part of the vehicle body frame 2 is provided with the pivot shaft 23Y and the pillion step 81 is pivotally supported with the intermediary of this pivot shaft 23Y. Thus, the exposure of the external of a step operating mechanism 82 that causes the pillion step 81 to pivot can be suppressed and appearance similar to that of existing motorcycles can be obtained.

Instead of the configuration in which the step support body 36 is rotatably supported on the pivot shaft 23Y, a configuration may be employed in which the step support body 36 is integrally joined to the rotating shaft of the motor 90M and is integrally rotated according to the rotation of the rotating shaft.

Sixth Embodiment

In a sixth embodiment, a case in which the present invention is applied to main steps 28 (rider steps) will be shown. Members corresponding to the respective members in the above respective embodiments are shown with the same symbols and different points will be described.

Figure 16:
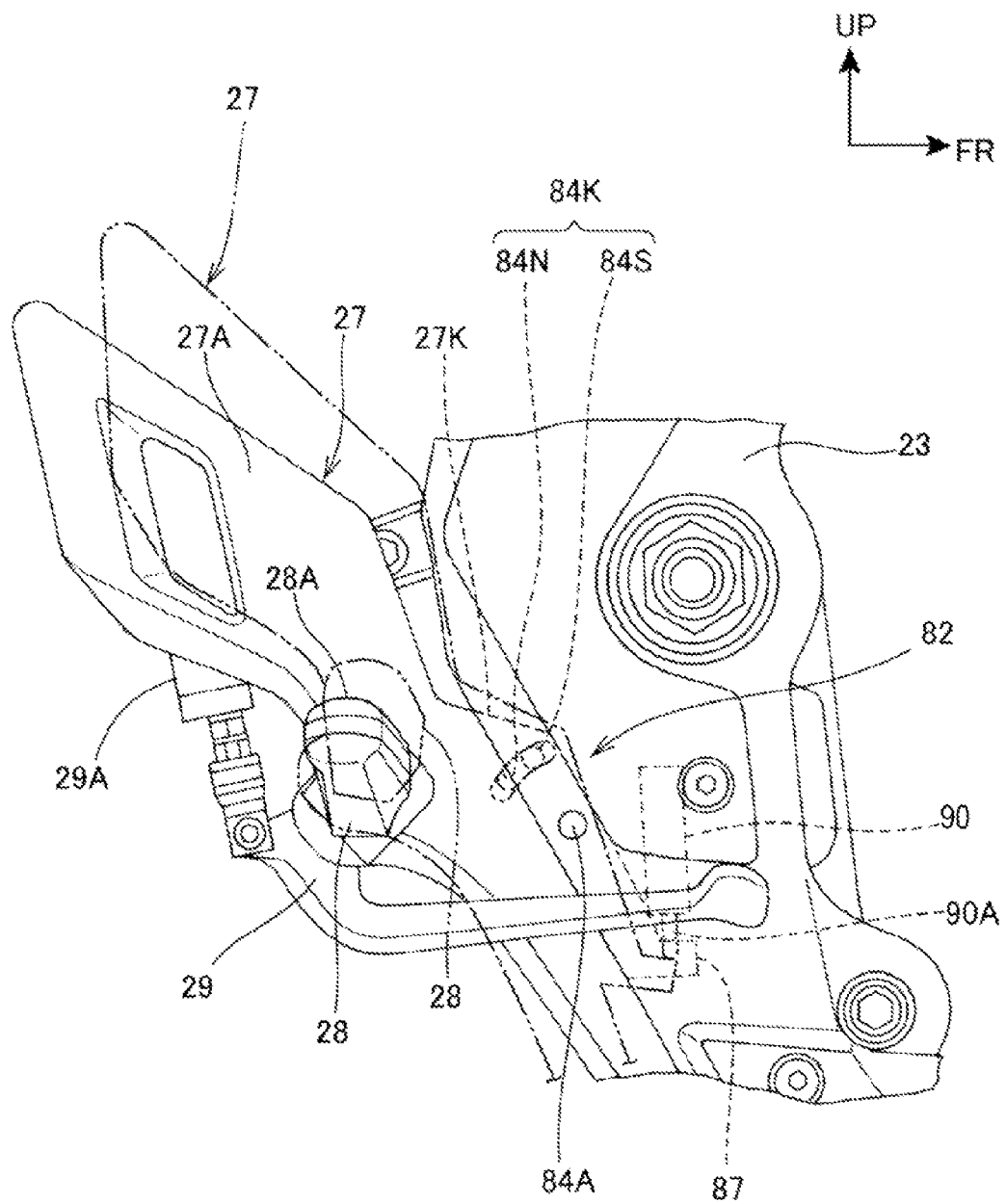
FIG. 16 is a diagram showing a right main step of a sixth embodiment with a step operating mechanism.
Figure 17:
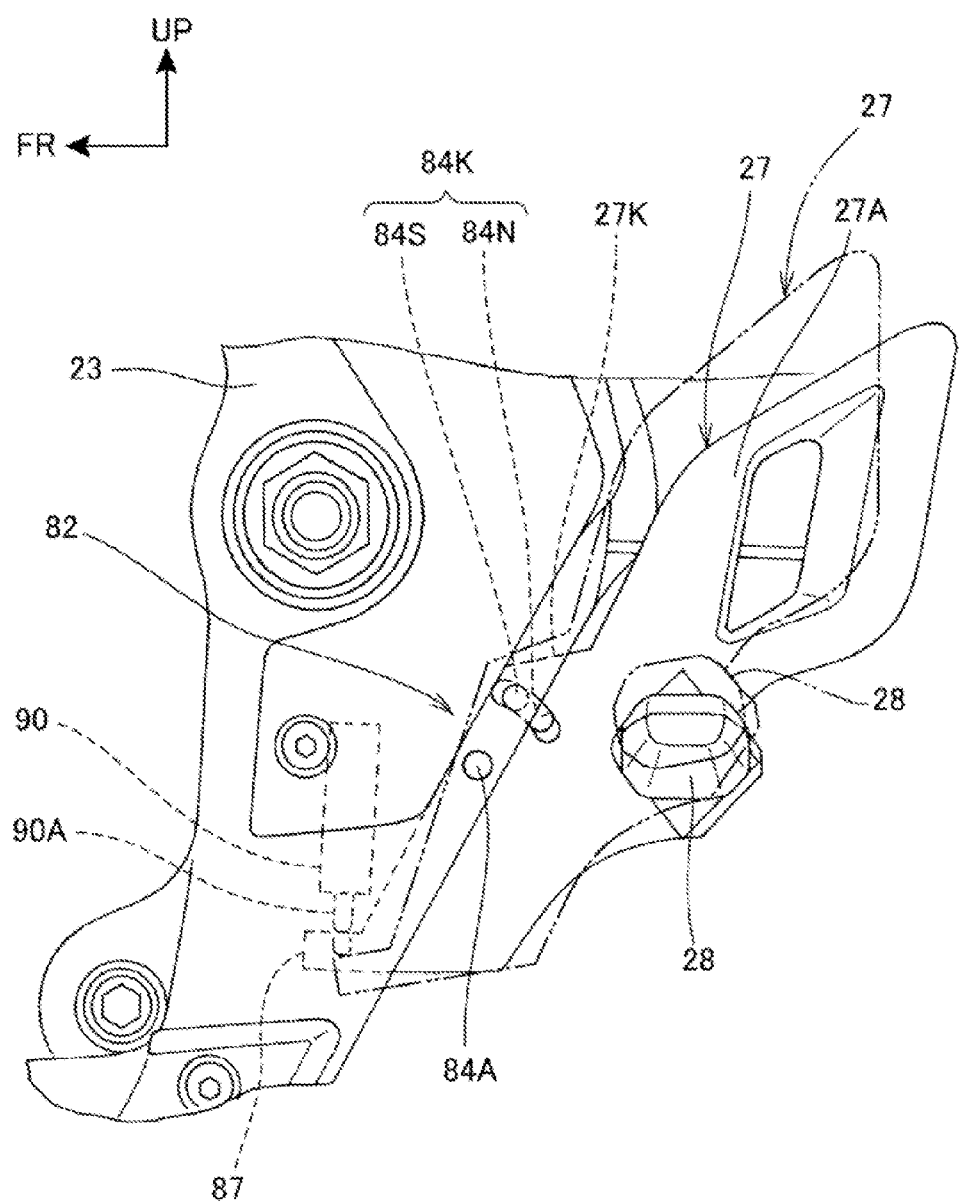
FIG. 17 is a diagram showing a left main step of the sixth embodiment with the step operating mechanism.

FIG. 16 is a diagram showing the right main step 28 with the peripheral configuration. FIG. 17 is a diagram showing the left main step 28 with the peripheral configuration.

The left and right main steps 28 are supported by left and right main step holders 27 functioning as base members supported by the rear lower parts of left and right pivot frames 23. At the upper part of each main step holder 27, a heel guard 27A is monolithically formed. This allows the rider to easily press the motorcycle 1 with the intermediary of the heel guards 27A and guards components disposed inside the heel guards 27A (e.g. master cylinder 29A actuated in association with a brake pedal 29, in FIG. 16) from the feet of the rider.

Each main step holder 27 monolithically includes an overlapping part 27K that overlaps with the pivot frame 23 in the vehicle width direction and this overlapping part 27K is pivotally joined to the pivot frame 23 with the intermediary of a pivot shaft 84A. Specifically, the overlapping part 27K extends forward toward the inside of the pivot frame 23 in the vehicle width direction and thereby overlaps with the pivot frame 23 in the vehicle width direction on the front side of the main step 28, and the pivot frame 23 is pivotally supported based on the pivot shaft 84A extending along the vehicle width direction. By the pivot of the pivot frame 23 based on this pivot shaft 84A, the main step 28 vertically moves.

This forms a step operating mechanism 82 that changes the position of the main step 28 vertically, i.e. the step operating mechanism 82 that changes the height of the main step 28.

In this step operating mechanism 82, an elongated hole 84N extending along the pivot direction based on the pivot shaft 84A is formed in either one of the overlapping part 27K of the main step holder 27 and the region of the pivot frame 23 overlapping with this overlapping part 27K (in the present configuration, on the side of the main step holder 27). On the other (in the present configuration, on the side of the pivot frame 23), a support part 84S that extends along the vehicle width direction and is disposed in the elongated hole 84N is provided.

These elongated hole 84N and support part 84S function as a restricting part 84K that restricts the pivot range of the pivot frame 23 and allow the height of the main step 28 to be changed between a low position shown by a solid line in FIGS. 16 and 17 and a high position shown by a two-dot chain line in FIGS. 16 and 17. The low position is similar to the conventional fixed position at the time of riding.

At the front lower parts of the left and right main step holders 27, arm parts 87 (moved parts) extending to the vehicle body inside of the pivot frames 23 in the range between the low position and the high position are monolithically provided. On the vehicle body inside surface of each pivot frame 23, an actuator 90 that actuates a respective of the arm parts 87 independently is disposed.

A movable part 90A of each actuator 90 abuts against the upper surface of the respective one of the arm parts 87 and presses the respective one of the arm parts 87 downward. Thereby, the movable parts 90A can each change the height of a respective one of the main steps 28 independently and keep the height.

In the present embodiment, the height of footrest surfaces 28A of the main steps 28 can be vertically changed by the step operating mechanisms 82 including the left and right actuators 90, with the footrest surfaces 28A kept as substantially horizontal surfaces (flat) along the vehicle width direction.

When turn operation is carried out, the ECU 100 that controls each actuator 90 controls the actuator 90 to increase the height of the step position on the opposite side to the turn direction of the vehicle. Specifically, the ECU 100 determines whether or not the vehicle speed is zero based on a detection result of the vehicle speed sensor 102. If the vehicle speed is not zero, the ECU 100 determines whether or not turn operation is carried out (including whether or not the present status is immediately before turn operation) based on the tilt of the vehicle body (roll angle), the roll rate (the amount of change in the roll angle per predetermined time), the steering angle of the front wheel 5, and specific information from the navigation device 109 (information or notification indicating that the traveling forward side is in a situation involving a turn, specifically e.g. notification of a sharp curve). Then, according to the determination result, the ECU 100 sets the step position on the opposite side to the turn direction at the above-described high position and keeps the other step position at the above-described low position. In the other cases, i.e. if turn operation is not carried out or if the vehicle speed is zero, the ECU 100 keeps the left and right main steps 28 at the low position, which is the conventional fixed position at the time of riding.

As described above, in the present embodiment, the motorcycle 1 includes the step operating mechanisms 82 that change the height of the main steps 28 and the ECU 100 carries out control to raise the height of the main step 28 on the opposite side to a turn direction in response to turn operation to the motorcycle 1. Thus, the main step 28 can be moved to a position to which the load to the outside at the time of the turn can be easily applied. This allows the rider to easily apply the outside foot load to the main step 28 and thus easily hold on. This can induce the rider to take a proper riding posture suitable for the traveling status of the motorcycle 1.

Furthermore, the main step holders 27 supporting the main steps 28 are swingably supported on the pivot frames 23 so that the height of the main steps 28 may be changed. This can reduce dedicated components for changing the height of the main steps 28 and provide a simple structure.

In addition, the main step holders 27 include the arm parts 87 extending to the vehicle body inside of the pivot frames 23 and the actuators 90 that actuate the arm parts 87 are disposed on the vehicle body inside of the pivot frames 23. This can achieve various kinds of effects similar to those of the above embodiments, such as the effect that the actuators 90 can be disposed at positions that are difficult to see from the vehicle body outside.

Seventh Embodiment

A seventh embodiment is another embodiment of the case in which the present invention is applied to the main steps 28 (rider steps). Left and right step operating mechanisms 82 that change the step position of left and right main steps 28 are identical to each other. Therefore, only the right side will be described below. Members corresponding to the respective members in the above respective embodiments are shown with the same symbols and different points will be described.

Figure 18:
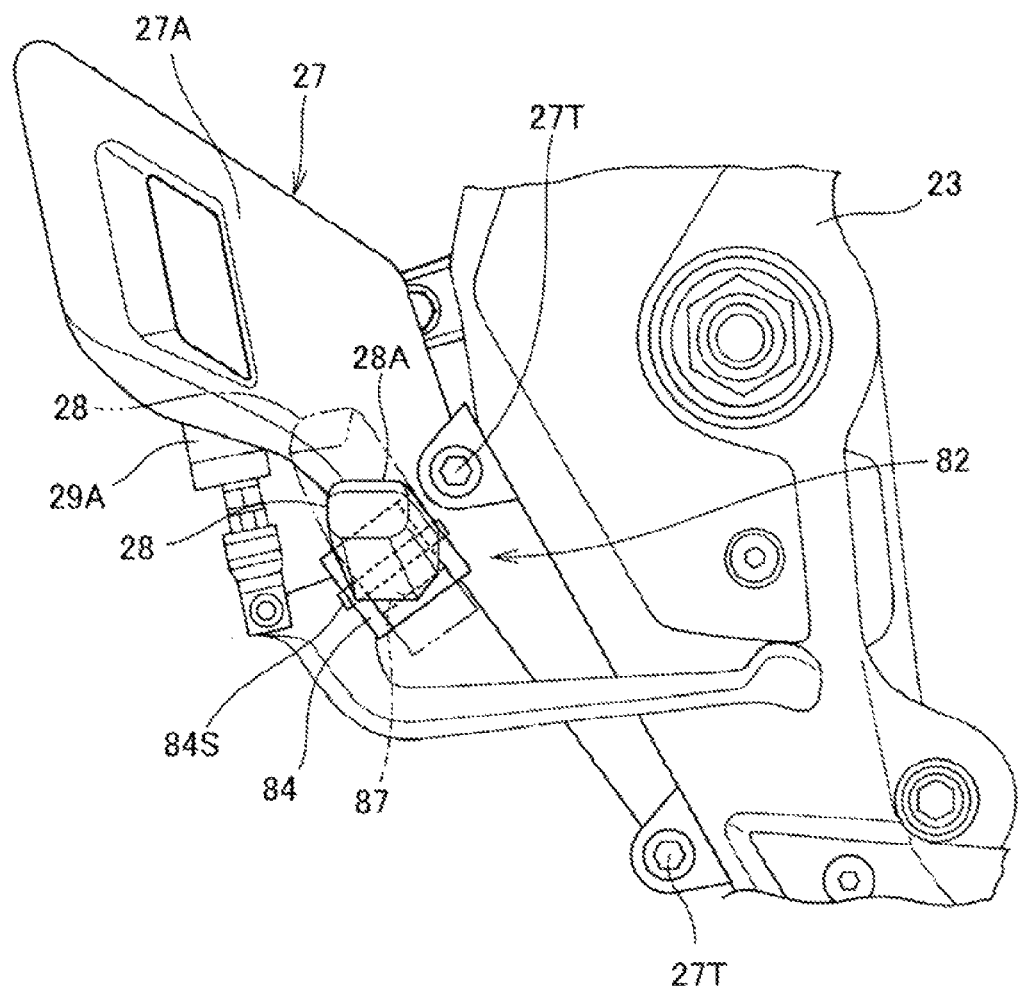
FIG. 18 is a diagram obtained when a right main step of a seventh embodiment is viewed with a step operating mechanism from the vehicle body right side.
Figure 19:
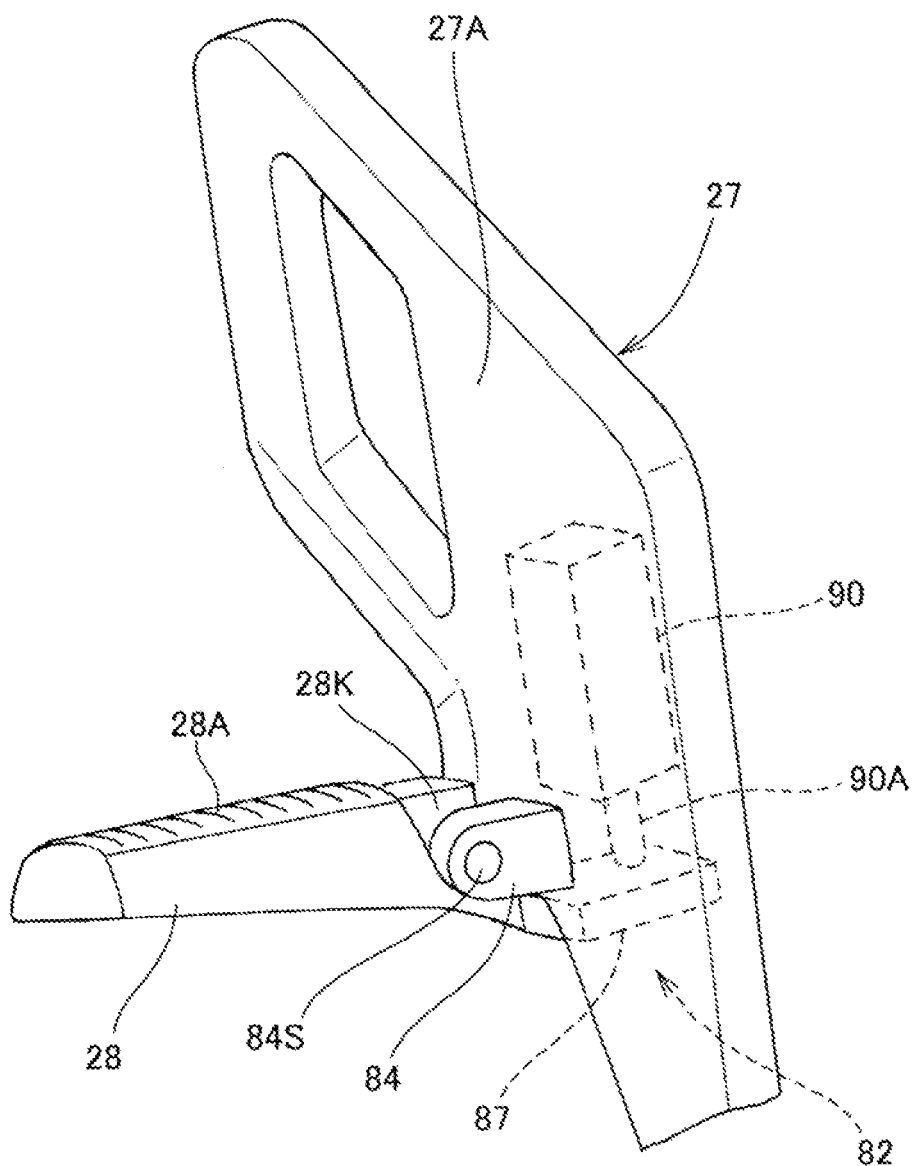
FIG. 19 is a perspective view obtained when the right main step of the seventh embodiment is viewed with the step operating mechanism from the vehicle body right front side.

FIG. 18 is a diagram obtained when the right main step 28 is viewed with the peripheral configuration from the vehicle body right side. FIG. 19 is a perspective view obtained when FIG. 18 is viewed from the vehicle body right front side.

A main step holder 27 is fastened and fixed to a pivot frame 23 with the intermediary of a fastening part 27T and functions as a base member supported by the pivot frame 23. This main step holder 27 is provided with a pivot member 84 that supports the main step 28 pivotally (escapably) toward the rear upper side.

The pivot member 84 pivotally supports a base end part 28K of the main step 28 with the intermediary of a pivot shaft 84S that is along the vehicle body front-rear direction and is inclined to have the lowered rear part. Thereby, the pivot member 84 supports the main step 28 pivotally to a neutral position (position shown by a solid line in FIG. 18) at which a footrest surface 28A of the main step 28 is set to a horizontal surface extending outward in the vehicle width direction when the vehicle body stands uptight and an inclined position (position shown by a two-dot chain line in FIG. 18) at which the footrest surface 28A is set to an inclined surface in which a portion of the step situated at the vehicle body outside is raised toward the vehicle body upper side relative to a portion of the step situated at the vehicle body inside when the vehicle body stands uptight.

At the base end part 28K of the main step 28, an arm member 87 (moved part) extending toward the vehicle body inside of the main step holder 27 at the neutral position and the inclined position is monolithically provided. On the vehicle body inside surface of the main step holder 27, an actuator 90 that actuates the arm member 87 independently is disposed.

A movable part 90A of the actuator 90 can set the main step 28 at the above-described neutral position and inclined position through the pivot member 84 by abutting against the upper surface of the arm member 87 and pressing the arm member 87 downward.

By supporting the main steps 28 in such a manner that the main steps 28 can pivot by the actuators 90 toward the side on which at least the footrest surface 28A becomes an inclined surface in which a portion of the step situated at the vehicle body outside is raised toward the vehicle body upper side relative to a portion of the step situated at the vehicle body inside, the rider can be induced to perform knee grip (in the case of the rider, the state in which the rider lightly clamps the fuel tank 9 by both knees).

Thus, by applying the control of the pillion steps 81 (step inclining control) in the first embodiment to the control of the main steps 28, step inclining control to change the position of the main steps 28 so that the footrest surfaces 28A of the main steps 28 may each become an inclined surface in which a portion of the step situated at the vehicle body outside is raised toward the vehicle body upper side relative to a portion of the step situated at the vehicle body inside can be carried out in response to acceleration operation, deceleration operation, and turn operation to the motorcycle 1. Therefore, various kinds of effects such as the effect that the rider can be induced to perform knee grip suitable for the traveling status of the motorcycle 1 can be achieved.

Furthermore, the footrest surfaces 28A of the main steps 28 are each set to the inclined surface in which a portion of the step situated at the vehicle body outside is raised toward the vehicle body upper side relative to a portion of the step situated at the vehicle body inside by using the pivot members 84 that support the main steps 28 escapably toward the rear upper side. Thus, the need for dedicated components for the setting to the inclined surface can be eliminated and a simple structure can be provided.

In addition, the main steps 28 have the arm parts 87 extending to the vehicle body inside of the main step holders 27 and the actuators 90 that actuate the arm parts 87 are disposed on the vehicle body inside of the main step holders 27. This can achieve various kinds of effects similar to those of the above embodiments, such as the effect that the actuators 90 can be disposed at positions that are difficult to see from the vehicle body outside.

In the present embodiment, the footrest surfaces 28A of the main steps 28 (rider steps) may be set to inclined surfaces only at the time of acceleration operation and deceleration operation to the motorcycle 1 and the footrest surfaces 28A may be kept at the neutral position, at which they are flat, at the time of turn operation. Alternatively, the footrest surfaces 28A of the main steps 28 (rider steps) may be set to inclined surfaces only at the time of deceleration operation to the motorcycle 1. The point is that it suffices that the footrest surfaces 28A of the main steps 28 (rider steps) are set to inclined surfaces in response to at least any of acceleration operation, deceleration operation, and turn operation to the motorcycle 1 and knee grip is induced according to the traveling status of the motorcycle 1.

The above-described embodiments are absolutely what show one aspect of the present invention and modifications and applications can be arbitrarily made without departing from the gist of the present invention.

For example, in the above embodiments, the ECU 100 may carry out control to change the inclination angle of the footrest surface 81A of the pillion step 81 or the footrest surface 28A of the main step 28 according to one or more of the acceleration (including the deceleration) and the amount of turn of the motorcycle 1. According to this configuration, it is possible to convey change in the behavior and the degree of change to a passenger or a rider according to the acceleration or the amount of turn and it is also possible to induce knee grip according to the acceleration and the amount of turn.

Furthermore, in the above embodiments, the cases in which the step inclining control is carried out in response to acceleration operation, deceleration operation, and turn operation to the motorcycle 1 are described. However, the step inclining control may be carried out in response to at least any of acceleration operation, deceleration operation, and turn operation.

Moreover, in the above embodiments, the cases in which the present invention is applied to the motorcycle 1 are described. However, the present invention is not limited thereto and can be widely applied to vehicles such as saddle-type vehicles including the steps 28 and 81 on which occupants (including driver and passenger) put feet. The saddle-type vehicles include overall vehicles an occupant rides astride the vehicle body and are vehicles including not only motorcycles (including motorized bicycles) but also three-wheeled vehicles and four-wheeled vehicles such as ATV (rough terrain vehicles). Furthermore, the power unit of the vehicle may be other than the engine 6 and may be e.g. a motor, of course.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE SYMBOLS

1 Motorcycle (saddle-type vehicle)
2 Vehicle body frame
27 Main step holder (base member)
28 Main step (step for driver)
28A Footrest surface of main step
81 Pillion step (passenger step)
81A Footrest surface of pillion step
82 Step operating mechanism
83 Base member
84 Pivot member
87 Arm part (moved part)
90 Actuator
90A Movable part
97 Cable
98 Drum
100 ECU (control unit)

What is claimed is:
1. A vehicle comprising:
  steps provided on left and right sides of the vehicle, respectively, and configured for supportively receiving feet of a vehicle occupant thereon;
  a step operating mechanism that is configured to selectively change a step position; and
  a control unit operatively connected to said step operating mechanism, said control unit being operable to change a position of the step in response to at least one of an acceleration operation, a deceleration operation, and a turn operation of the vehicle,
  wherein:
  the step operating mechanism is configured to change a height of the step for the occupant; and
  the control unit is configured to control the step operating mechanism to raise the height of the step position on an opposite side to a turn direction of the vehicle.

2. A vehicle comprising:
  steps provided on left and right sides of the vehicle, respectively, and configured for supportively receiving feet of a vehicle occupant thereon;
  a step operating mechanism that is configured to selectively change a step position; and
  a control unit operatively connected to said step operating mechanism, said control unit being operable to change a position of the step in response to at least one of an acceleration operation, a deceleration operation, and a turn operation of the vehicle,
  wherein:
  the steps comprise a main step including a footrest surface;
  the step operating mechanism is configured to pivot the main step for the occupant; and
  the control unit is configured to carry out step inclining control to pivot the main step for the occupant in order for the footrest surface of the main step to become an inclined surface, in which the main step is pivotally raised such that a portion of the main step spaced away from a vehicle body is raised toward a vehicle body upper side relative to a portion of the main step near the vehicle body, in response to at least one of an acceleration operation, a deceleration operation, and a turn operation of the vehicle.

3. A vehicle comprising:
  steps provided on left and right sides of the vehicle, respectively, and configured for supportively receiving feet of a vehicle occupant thereon;
  a step operating mechanism that is configured to selectively change a step position; and
  a control unit operatively connected to said step operating mechanism, said control unit being operable to change a position of the step in response to at least one of an acceleration operation, a deceleration operation, and a turn operation of the vehicle,
  wherein:
  the steps comprise a passenger step including a footrest surface;
  the step operating mechanism is configured to pivot the passenger step for supportively receiving feet of the vehicle occupant thereon; and
  the control unit is configured to carry out step inclining control to pivot the passenger step in order for the footrest surface of the passenger step to become an inclined surface, in which the passenger step is pivotally raised such that a portion of the passenger step spaced away from a vehicle body is raised toward a vehicle body upper side relative to a portion of the passenger step near the vehicle body, in response to at least one of an acceleration operation, a deceleration operation, and a turn operation of the vehicle.

4. The vehicle including steps according to claim 3, wherein in a case in which vehicle speed is zero, the control unit determines whether the vehicle is in a starting preparatory state when a clutch of the vehicle is blocking power transmission and a shift stage of the vehicle is other than neutral, and the control unit carries out the step inclining control when determining that the vehicle is in the starting preparatory state, and then the control unit controls moving the passenger step to a neutral position at which the footrest surface is flat when determining that the vehicle is not in the starting preparatory state.

5. The vehicle including steps according to claim 4, wherein in a case in which vehicle speed is not zero, the control unit controls the step inclining operation when the acceleration of the vehicle is positive, equal to or higher than a predetermined value, and when the acceleration of the vehicle is negative, equal to or lower than a predetermined value, and the control unit controls moving the passenger step to a neutral position at which the footrest surface is flat when the acceleration of the vehicle falls within a predetermined range.

6. The vehicle including steps according to claim 4, wherein an inclination angle of the footrest surface is changed according to one of an acceleration of the vehicle and an amount of turn in the step inclining control.

7. The vehicle including steps according to claim 4, wherein the step operating mechanism includes:
  a base member supported by the vehicle;
  a pivot member that pivotally supports the passenger step to the base member; and
  an actuator that is operable to cause the passenger step to pivot,
  the pivot member pivotally supports the passenger step toward a side on which at least the footrest surface becomes an inclined surface in which the portion the passenger step spaced away from the vehicle body is raised toward the vehicle body upper side relative to the portion of the passenger step near the vehicle body, and
  the passenger step is provided with a moved part moved by the actuator.

8. The vehicle including steps according to claim 4, wherein the step operating mechanism includes:
  a base member supported by the vehicle,
  a first pivot member that supports, to the base member, the passenger step pivotally toward a side on which at least the footrest surface becomes an inclined surface, in which the portion the passenger step spaced away from the vehicle body is raised toward the vehicle body upper side relative to the portion of the passenger step near the vehicle body,
  a second pivot member that supports, to the base member, the passenger step pivotally in a direction different from a direction of pivot by the first pivot member, and
  an actuator that is operable to cause the passenger step to pivot through the first pivot member, and
  the passenger step is provided with a moved part moved by the actuator.

9. The vehicle including steps according to claim 4, wherein the steps further comprise another passenger step; the step operating mechanism includes:
  a base member that is supported by the vehicle and pivotally supports the passenger step,
  a pivot member that supports the passenger step pivotally toward a side on which at least the footrest surface becomes an inclined surface, in which the portion the passenger step spaced away from the vehicle body is raised toward the vehicle body upper side relative to the portion of the passenger step near the vehicle body,
  a moved part that is pivotally supported by the base member below the base member and causes the passenger step to pivot through the pivot member, and
  an actuator that pivots the passenger step through the moved part, and
  the actuator has a drum that winds up cables each connected to a respective one of the passenger steps on left and right sides and each of the cables is made to pass through a lower side of the base member to be joined to the moved part.

10. The vehicle including steps according to claim 4, wherein
  the steps further comprise another passenger step;
  the step operating mechanism includes:
  a base member that is supported by the vehicle and pivotally supports the passenger step,
  a pivot member that supports the passenger step pivotally toward a side on which at least the footrest surface becomes an inclined surface in which the portion the passenger step spaced away from the vehicle body is raised toward the vehicle body upper side relative to the portion of the passenger step near the vehicle body, a moved part that is pivotally supported by the base member below the base member and causes the passenger steps to pivot through the pivot member, and an actuator that pivots the passenger step through the moved part, and the actuator has a drum that winds up cables each connected to a respective one of the passenger steps on left and right sides and each of the cables is made to pass through inside of the base member in a vehicle width direction to be joined to the moved part.

11. The vehicle including steps according to claim 3, wherein in a case in which vehicle speed is not zero, the control unit controls the step inclining when the acceleration of the vehicle is positive, equal to or higher than a predetermined value, and when the acceleration of the vehicle is negative, equal to or lower than a predetermined value, and the control unit controls moving the passenger step to a neutral position at which the footrest surface is flat when the acceleration of the vehicle falls within a predetermined range.

12. The vehicle including steps according to claim 3, wherein an inclination angle of the footrest surface is changed according to one of an acceleration of the vehicle and an amount of turn in the step inclining control.

13. The vehicle including steps according to claim 3, wherein the step operating mechanism includes:
a base member supported by the vehicle;
a pivot member that pivotally supports the passenger step to the base member; and
an actuator that is operable to cause the passenger step to pivot,
the pivot member pivotally supports the passenger step toward a side on which at least the footrest surface becomes an inclined surface in which the portion the passenger step spaced away from the vehicle body is raised toward the vehicle body upper side relative to the portion of the passenger step near the vehicle body, and
the passenger step is provided with a movable part configured to be moved by the actuator.

14. The vehicle including steps according to claim 13, wherein
the actuator includes a movable part;
the pivot member allows the passenger step to pivot to a housing position; and
the moved part gets away from the movable part of the actuator when the passenger step pivots toward the housing position.

15. The vehicle including steps according to claim 14, wherein the movable part of the actuator is inwardly disposed on the vehicle body relative to the base member, and
the moved part inwardly extends to the vehicle body relative to the pivot member and the passenger step outwardly extends from the pivot member to the vehicle body.

16. The vehicle including steps according to claim 3, wherein the step operating mechanism includes:
a base member supported by the vehicle,
a first pivot member that supports, to the base member, the passenger step pivotally toward a side on which at least the footrest surface becomes an inclined surface, in which the portion the passenger step spaced away from the vehicle body is raised toward the vehicle body upper side relative to the portion of the passenger step near the vehicle body,
a second pivot member that supports, to the base member, the passenger step pivotally in a direction different from a direction of pivot by the first pivot member, and
an actuator that pivots the passenger step through the first pivot member, and
the passenger step is provided with a moved part moved by the actuator.

17. The vehicle including steps according to claim 3, wherein the steps further comprise another passenger step; the step operating mechanism includes:
a base member that is supported by the vehicle and pivotally supports the passenger step,
a pivot member that supports the passenger step pivotally toward a side on which at least the footrest surface becomes an inclined surface, in which the portion the passenger step spaced away from the vehicle body is raised toward the vehicle body upper side relative to the portion of the passenger step near the vehicle body,
a moved part that is pivotally supported by the base member below the base member and causes the passenger step to pivot through the pivot member, and
an actuator that is operable to cause the passenger step to pivot through the moved part, and
the actuator comprises a drum that winds up cables, each connected to a respective one of the passenger steps on left and right sides, and each of the cables is made to pass through a lower side of the base member to be joined to the moved part.

18. The vehicle including steps according to claim 3, wherein the steps further comprise another passenger step; the step operating mechanism includes:
a base member that is supported by the vehicle and pivotally supports the passenger step,
a pivot member that supports the passenger step pivotally toward a side on which at least the footrest surface becomes an inclined surface in which the portion the passenger step spaced away from the vehicle body is raised toward the vehicle body upper side relative to the portion of the passenger step near the vehicle body,
a moved part that is pivotally supported by the base member below the base member and causes the passenger steps to pivot through the pivot member, and
an actuator that pivots the passenger step through the moved part, and
the actuator has a drum that winds up cables each connected to a respective one of the passenger steps on left and right sides and each of the cables is made to pass through inside of the base member in a vehicle width direction to be joined to the moved part.

* * * * *